United States Patent
Lo et al.

(10) Patent No.: US 10,129,308 B2
(45) Date of Patent: Nov. 13, 2018

(54) SESSION DESCRIPTION INFORMATION FOR OVER-THE-AIR BROADCAST MEDIA DATA

(71) Applicant: QUALCOMM Incorporated, San Diego, CA (US)

(72) Inventors: Charles Nung Lo, San Diego, CA (US); Thomas Stockhammer, Bergen (DE); Michael George Luby, Berkeley, CA (US); Carlos Marcelo Dias Pazos, Carlsbad, CA (US); Jun Wang, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 14/989,540

(22) Filed: Jan. 6, 2016

(65) Prior Publication Data

US 2016/0205158 A1    Jul. 14, 2016

Related U.S. Application Data

(60) Provisional application No. 62/101,236, filed on Jan. 8, 2015.

(51) Int. Cl.
*H04L 29/06* (2006.01)
*H04L 12/741* (2013.01)
(Continued)

(52) U.S. Cl.
CPC ........ *H04L 65/4076* (2013.01); *H04L 1/0045* (2013.01); *H04L 45/74* (2013.01);
(Continued)

(58) Field of Classification Search
None
See application file for complete search history.

(56) References Cited

U.S. PATENT DOCUMENTS

2006/0248090 A1    11/2006   Bennett et al.
2008/0107108 A1*   5/2008    Bouazizi ............ H04N 7/17318
                                                      370/389
(Continued)

FOREIGN PATENT DOCUMENTS

WO         2014169233 A2     10/2014

OTHER PUBLICATIONS

3rd Generation Partnership Project; Technical Specification Group Services and System Aspects; Multimedia Broadcast/Multicast Service (MBMS); Protocols and codecs (Release 12) GPP TS 26.346 v12.4.0, Dec. 2014, 207 pp.

(Continued)

*Primary Examiner* — Natisha D Cox
(74) *Attorney, Agent, or Firm* — Shumaker & Sieffert, P.A.

(57) ABSTRACT

An over-the-air (OTA) broadcast middleware unit is configured to receive aggregated session description data for a plurality of sessions, wherein each of the sessions transports media data related to common media content, and wherein each of the sessions is transmitted as part of an OTA broadcast, and extract at least some of the media data from the OTA broadcast based on the aggregated session description data. The OTA broadcast middleware unit may further deliver the extracted media data to a streaming client, such as a Dynamic Adaptive Streaming over HTTP (DASH) client.

11 Claims, 17 Drawing Sheets

(51) Int. Cl.
  H04L 1/00       (2006.01)
  H04L 29/08      (2006.01)
  H04N 21/2362    (2011.01)
  H04N 21/2381    (2011.01)
  H04N 21/262     (2011.01)
  H04N 21/443     (2011.01)
  H04W 4/06       (2009.01)

(52) U.S. Cl.
  CPC .............. *H04L 65/00* (2013.01); *H04L 67/02* (2013.01); *H04L 67/142* (2013.01); *H04N 21/2362* (2013.01); *H04N 21/2381* (2013.01); *H04N 21/26258* (2013.01); *H04N 21/4433* (2013.01); *H04W 4/06* (2013.01)

(56) References Cited

U.S. PATENT DOCUMENTS

| | | | | |
|---|---|---|---|---|
| 2008/0151885 | A1* | 6/2008 | Horn | H04L 29/06027 370/389 |
| 2010/0122305 | A1* | 5/2010 | Moloney | G06F 21/10 725/93 |
| 2010/0158007 | A1* | 6/2010 | Kim | H04L 63/1416 370/392 |
| 2012/0317303 | A1* | 12/2012 | Wang | H04L 65/4076 709/231 |
| 2013/0254611 | A1* | 9/2013 | Amerga | H04N 19/895 714/746 |
| 2014/0199044 | A1* | 7/2014 | Gupta | H04L 67/10 386/239 |
| 2014/0307734 | A1* | 10/2014 | Luby | H04L 12/18 370/390 |
| 2016/0261893 | A1* | 9/2016 | Oh | H04N 21/238 |
| 2017/0257666 | A1* | 9/2017 | Hines | H04N 7/0882 |
| 2017/0264933 | A1* | 9/2017 | Kitazato | H04N 21/2625 |

OTHER PUBLICATIONS

International Search Report and Written Opinion from International Application No. PCT/US2016/012422, dated Apr. 12, 2016, 14 pp.

Walsh, "SDP Descriptors for FLUTE; draft-mehta-rmt-flute-sdp-06.txt", Internet Engineering Task Force, IETF; Standardworkingdraft, Internet Society (ISOC) 4, Rue Des Falaises Ch—1205 Geneva, Switzerland, No. 6, Jun. 2010, XP015069233, 31 pp.

Response to Written Opinion dated Apr. 12, 2016, from International Application No. PCT/US2016/012422, filed on Nov. 8, 2016, 5 pp.

Watson, et al., "Forward Error Correction (FEC) Building Block," Network Working Group, RFC 5052, Aug. 2007, 25 pp.

Paila, et al., "FLUTE—File Delivery over Unidirectional Transport," Internet Engineering Task Force (IETF), RFC 6726, Nov. 2012, 46 pp.

"ATSC Working Draft: Signaling, Delivery, Synchronization, and Error Protection," ATSC, Advanced Television Systems Committee, Doc. S33-1-384r12; Jun. 18, 2015, Revision 12, Oct. 2, 2015; 142 pp.

"Real-Time Object Delivery over Unidirectional Transport (ROUTE)," Doc. S33-1-171r1; Aug. 11, 2014; 46 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Second Written Opinion issued in International Application No. PCT/US2016/012422 dated Apr. 18, 2017, 7 pp.

International Preliminary Report on Patentability issued in International Application No. PCT/US2016/012422 dated Jun. 9, 2017, 9 pp.

* cited by examiner

SESSION DESCRIPTION INFORMATION FOR OVER-THE-AIR BROADCAST MEDIA DATA

This application claims the benefit of U.S. Provisional Application No. 62/101,236, filed Jan. 8, 2015, the entire contents of which are hereby incorporated by reference.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as "High Efficiency Video Coding" or "HEVC"), and extensions of such standards, to transmit and receive digital video information more efficiently.

Video compression techniques perform spatial prediction and/or temporal prediction to reduce or remove redundancy inherent in video sequences. After video data has been encoded, the video data may be packetized for transmission. The video data may be assembled into a video file conforming to any of a variety of standards, such as the International Organization for Standardization (ISO) base media file format and extensions thereof, such as AVC.

SUMMARY

In general, the techniques of this disclosure relate to signaling aggregate session description information for a plurality of sessions of over-the-air (OTA) broadcasted media data. That is, each of the sessions may transport media data related to common media content, and each of the sessions may be transmitted as part of an OTA broadcast. The common media content may correspond to, for example, a set of multiplexed representations according to Dynamic Adaptive Streaming over HTTP (DASH). That is, each session may transport media data of a different one of the representations. The aggregate session description information may generally describe each of the sessions. For example, the aggregate session description information may include data that are conceptually similar to a file delivery table (FDT) and a session description protocol (SDP) file.

In one example, a method of receiving media data is performed by an over-the-air (OTA) broadcast middleware unit and includes receiving aggregated session description data for a plurality of sessions, wherein each of the sessions transports media data related to common media content, and wherein each of the sessions is transmitted as part of an OTA broadcast, and extracting at least some of the media data from the OTA broadcast based on the aggregated session description data.

In another example, a device for receiving media data includes an interface configured to receive over-the-air (OTA) broadcast data; and a processor comprising an OTA broadcast middleware unit configured to receive, via the interface, aggregated session description data for a plurality of sessions, wherein each of the sessions transports media data related to common media content, and wherein each of the sessions is transmitted as part of an OTA broadcast, and extract at least some of the media data from the OTA broadcast based on the aggregated session description data.

In another example, a device for receiving media data includes means for receiving aggregated session description data for a plurality of sessions, wherein each of the sessions transports media data related to common media content, and wherein each of the sessions is transmitted as part of an OTA broadcast, and means for extracting at least some of the media data from the OTA broadcast based on the aggregated session description data.

In another example, a non-transitory computer-readable storage medium has stored thereon instructions that, when executed, cause a processor of a device for receiving media data to receive aggregated session description data for a plurality of sessions, wherein each of the sessions transports media data related to common media content, and wherein each of the sessions is transmitted as part of an over-the-air (OTA) broadcast, and extract at least some of the media data from the OTA broadcast based on the aggregated session description data.

The details of one or more examples are set forth in the accompanying drawings and the description below. Other features, objects, and advantages will be apparent from the description and drawings, and from the claims.

DETAILED DESCRIPTION

Figure 1:
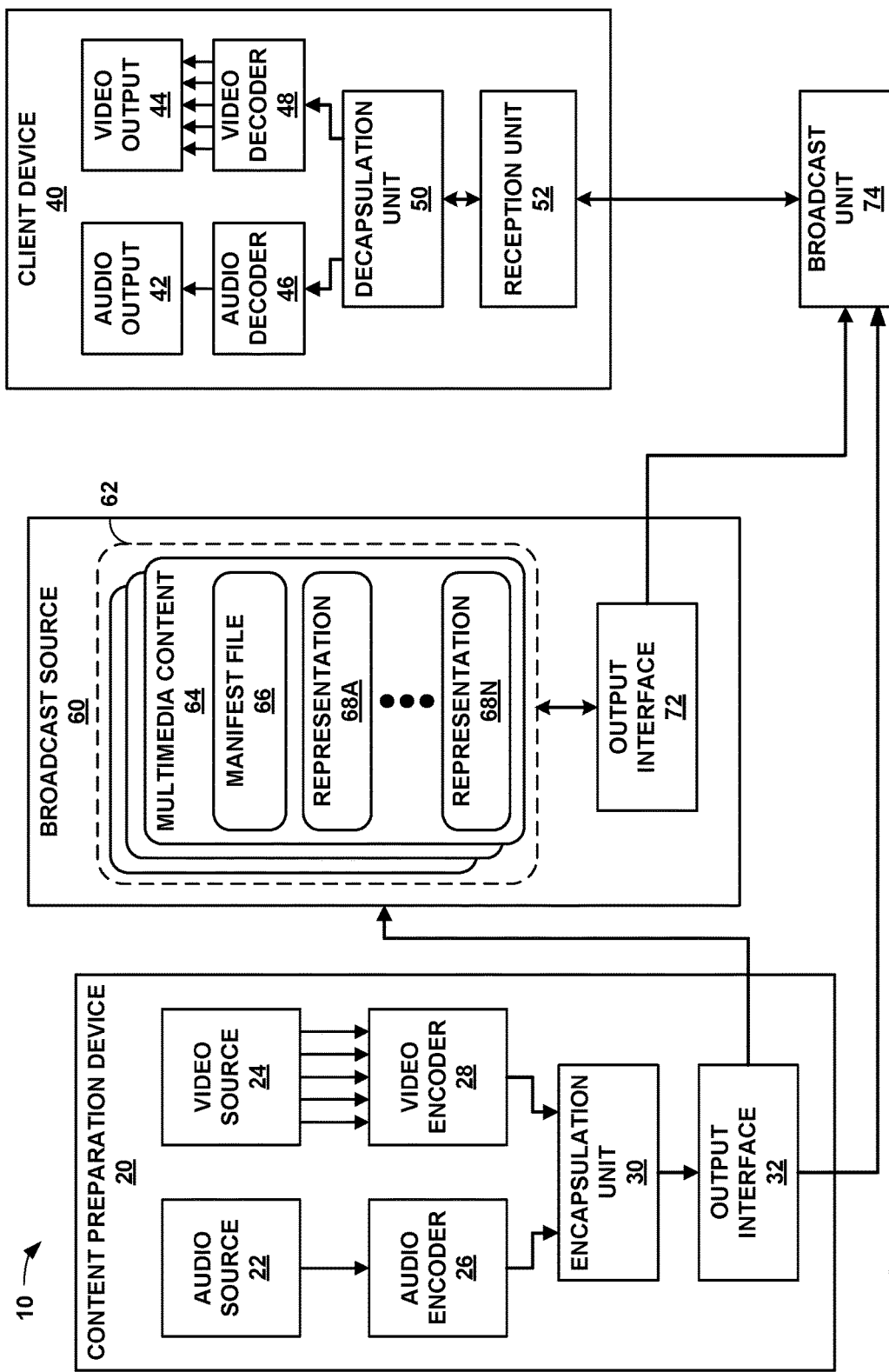
FIG. 1 is a block diagram illustrating an example system that implements techniques for streaming media data via an over-the-air (OTA) broadcast.

In general, this disclosure describes techniques related to signaling of service data and service discovery bootstrapping when broadcasting media data using an over-the-air (OTA) broadcast service, such as an Advanced Television Systems Committee (ATSC) broadcast according to ATSC 3.0, also known as ATSC Next Generation Broadcast Television (NGBT), or other such OTA broadcast services, such as Digital Video Broadcasting (DVB), Integrated Services Digital Broadcasting (ISDB), and Digital Terrestrial Multimedia Broadcast (DTMB). The OTA broadcast may utilize techniques of Real-Time Object Delivery over Unidirectional Transport (ROUTE) protocol. The OTA broadcast may specify an Internet protocol (IP)-based broadcast service delivery, and use ROUTE protocol and Extensible Markup Language (XML)-based service signaling based on (e.g., modeled after) a user service description (USD)/Service Announcement framework defined for Third Generation Partnership Project (3GPP) multimedia broadcast multicast service (MBMS), as proposed as part of the so-called "service layer" (formally referred to in ATSC 3.0 as "Management & Protocols" layer). The media data may be formatted according to Dynamic Adaptive Streaming over HTTP (DASH), such that DASH segments are carried as part of the OTA broadcast. This disclosure describes an example service layer signaling data model, an example service discovery bootstrapping process, and a network channelization model, among other techniques.

This disclosure describes various techniques, which may be implemented alone or in any combination. As noted above, in some examples, the techniques of this disclosure may be implemented when transporting streaming segments, e.g., DASH segments, using an OTA broadcast, which may utilize ROUTE protocol. The techniques of this disclosure include sending session description protocol (SDP) information for a plurality of sessions as a single, aggregated fragment. That is, whereas previous techniques may have sent individual SDP fragments per session, this disclosure describes techniques for sending a single fragment for a plurality of sessions (related to common media content). The common media content may correspond to the same media content, e.g., a multiplexed DASH Representation comprising related audio, video, and/or timed text media data, alone or in any combination, for the same program. The single fragment may comprise a layered coding transport (LCT) Session Instance Description (LSID) fragment, as discussed in greater detail below. Thus, individual session description information need not be sent for each session related to the same media content. A plurality of sessions for related media content may comprise, for example, a plurality of views for multi-view content, as well as one or more audio representations and/or timed text (e.g., for closed captions), or other such data. Accordingly, in some examples, the LSID fragment may describe session information for each of the views, audio, and timed text representations.

As another example, this disclosure describes techniques for sending file descriptors out-of-band. For example, a file delivery table (FDT) may be included in the LSID fragment (i.e., carried within LSID fragment), and the FDT may be delivered in a separate communication than the corresponding media data (i.e., carried outside the LSID fragment, or in a communication session or channel separate from that carrying the LSID). The entire FDT or a portion of the FDT may be delivered separately from the corresponding media data. In this manner, error resiliency may be improved relative to delivering the FDT in-band (that is, as part of the same bitstream and/or communication as the corresponding media data).

As the contents of either the inband or out-of-band FDT in this disclosure may include additional file descriptors which are not contained in the nominal FDT (as described in RFC 6726), such FDT object in this disclosure is formally referred to as the Extended FDT, or EFDT.

In DASH, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of DASH, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to a DASH client. The DASH client may request and download media data information to present a streaming service to a user of the client device. A media presentation may be described in the MPD data structure, which may include updates of the MPD.

A media presentation may contain a sequence of one or more periods. Periods may be defined by a Period element in the MPD. Each period may have an attribute start in the MPD. The MPD may include a start attribute and an availableStartTime attribute for each period.

Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data via an over-the-air (OTA) broadcast. In this example, system 10 includes content preparation device 20, broadcast source device 60, broadcast unit 74, and client device 40. Broadcast source device 60 may comprise, for example, a television network office, a cable television office, or the like. Broadcast unit 74 may comprise, for example, a satellite, a cable television distribution hub, an antenna, or the like. Although only a single broadcast unit 74 is shown in the example of FIG. 1, it should be understood that multiple intermediate devices may be positioned between broadcast source device 60 and client device 40. In some examples, content preparation device 20 and broadcast source device 60 may be coupled by a computer-based network or may be directly communicatively coupled. Alternatively, content preparation device 20 may supply multimedia content to broadcast source device 60 via delivery of a computer-readable storage medium, such as a hard disk, a flash drive, a CD, a DVD, a Blu-ray disc, or the like. In some examples, content preparation device 20 and broadcast source device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to broadcast source device 60 in all examples, but may store multimedia content to a separate medium that is read by broadcast source device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and/or with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. In addition, encapsulation unit 30 may form a manifest file, such as a media presentation descriptor (MPD), that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to broadcast source device 60 via network transmission or storage media. In the example of FIG. 1, broadcast source device 60 includes storage medium 62 that stores various multimedia contents 64, each including a respective manifest file 66 and one or more representations 68A-68N (representations 68). In some examples, output interface 32 may also send data directly to broadcast unit 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Broadcast source device 60 includes output interface 72. Broadcast source device 60 provides multimedia content to broadcast unit 74 via output interface 72.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, reception unit 52 may include both an OTA broadcast middleware unit and a media player client. The OTA broadcast middleware unit may act as a proxy server for the media player client, which may be configured to retrieve media data via network protocols, e.g., in accordance with Dynamic Adaptive Streaming over HTTP (DASH). That is, the media client may comprise a DASH client. Thus, the media client may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. The media client may be configured to submit HTTP GET and partial GET requests to the OTA broadcast middleware unit. Certain aspects of reception unit 52 may be implemented as software instructions executed by one or more processors or processing units (not shown) of client device 40. That is, portions of the functionality described with respect to reception unit 52 may be implemented in hardware, or a combination of hardware, software, and/or firmware, where requisite hardware may be provided to execute instructions for software or firmware.

The media player client of reception unit 52 may compare the decoding and rendering capabilities of client device 40 to characteristics of representations 68 indicated by information of manifest file 66. The media player client may initially retrieve at least a portion of manifest file 66 to determine characteristics of representations 68. For example, the media player client may request a portion of manifest file 66 that describes characteristics of one or more adaptation sets. The media player client may select a subset of representations 68 (e.g., an adaptation set) having characteristics that can be satisfied by the coding and rendering capabilities of client device 40. The media player client may then determine bitrates for representations in the adaptation set, determine a currently available amount of network bandwidth, and retrieve segments from one of the representations having a bitrate that can be satisfied by the network bandwidth.

As noted above, reception unit 52 may include an OTA broadcast middleware unit. The OTA broadcast middleware unit may be configured to receive OTA broadcast signals, e.g., in accordance with ATSC. Furthermore, the OTA broadcast middleware unit may implement a network proxy server that caches received media data locally and responds to network requests for data from a media player client of reception unit 52.

Reception unit 52 provides received segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, reception unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, reception unit 52, and/or decapsulation unit 50 may comprise an integrated circuit, a microprocessor, and/or a wireless communication device, such as a cellular telephone.

Client device 40, broadcast source device 60, and/or content preparation device 20 may be configured to operate in accordance with the techniques of this disclosure. For purposes of example, this disclosure describes these techniques with respect to client device 40 and broadcast source device 60. However, it should be understood that content preparation device 20 may be configured to perform these techniques, instead of (or in addition to) broadcast source device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, reception unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote source such as broadcast source device 60 via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium 34, such as, for example, a transmission signal, a magnetic medium, an optical medium, a memory, a flash drive, or other computer-readable medium.

Reception unit 52 extracts NAL units or access units from broadcast signals received from broadcast unit 74 and provides the NAL units or access units to reception unit 52, which may deliver the NAL units to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Although not shown explicitly in the example of FIG. 1, client device 40 may further include a media application. The media application may perform all or a portion of the functionality of any of audio decoder 46, video decoder 48, decapsulation unit 50, and/or reception unit 52. For example, the media application may form part of reception unit 52, or be separate from reception unit 52. In addition to the functionality described above, the media application may cause client device 40 to present a user interface, such as a graphical user interface (GUI) to a user to allow for selection of multimedia data, such as a movie or other program content. The media application may provide an indication of the selected content to reception unit 52 to cause reception unit 52 to receive media data of the selected program content, as discussed above. The media application may be stand-alone software.

Furthermore, in accordance with the techniques of this disclosure, reception unit 52 may receive object/file descriptors (e.g., a file delivery table (FDT) or substantially similar data) out of band relative to the corresponding media data. The FDT may conform to Paila et al., "FLUTE—File Delivery over Unidirectional Transport," Internet Engineering Task Force, RFC 6726, November 2012, available at tools.ietf.org/html/rfc6726. Additionally or alternatively, reception unit 52 may receive a single fragment (e.g., an LSID fragment) including aggregated session description information for a plurality of sessions related to the same media content. Similarly, output interfaces 32, 72 may be configured to send object/file descriptors out of band and/or to send a single fragment including aggregated session description information for a plurality of sessions. These and other techniques are described in greater detail below with respect to FIGS. 4-15.

Figure 2:
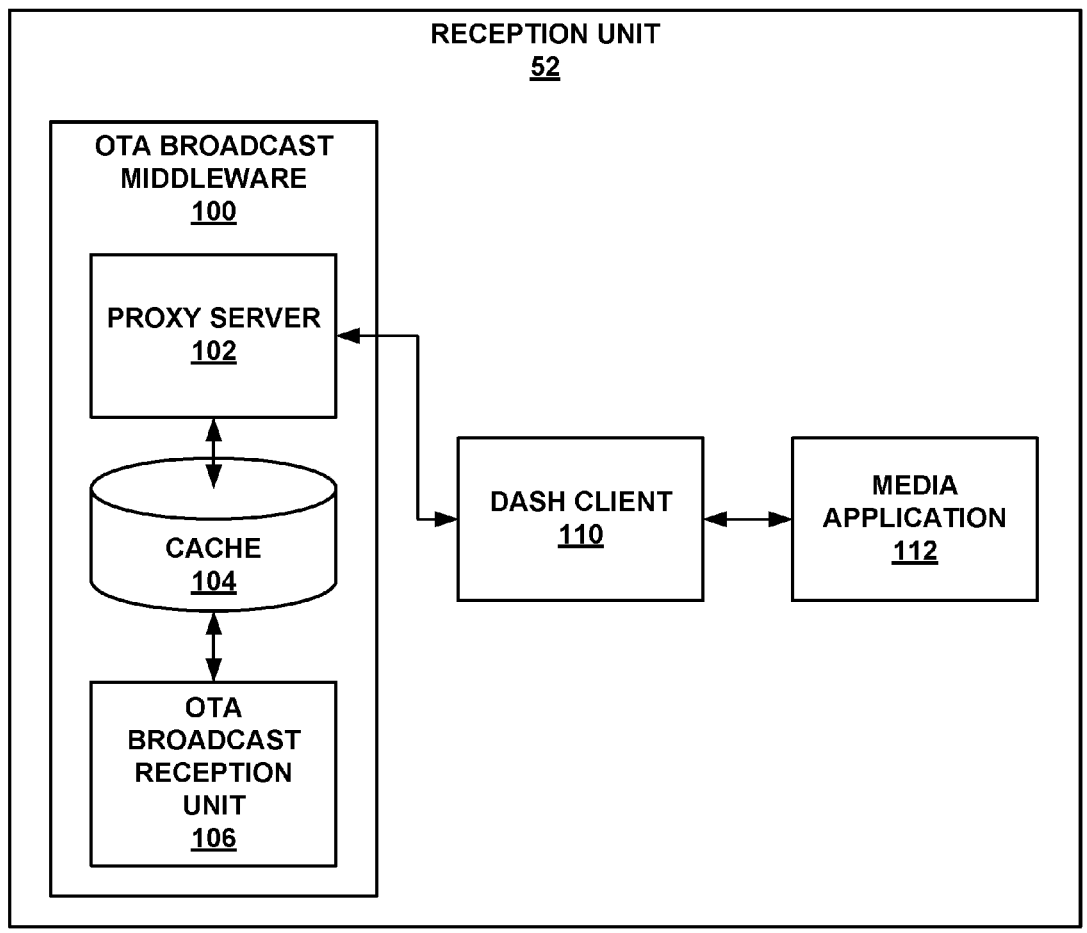
FIG. 2 is a block diagram illustrating an example set of components of the reception unit of FIG. 1 in greater detail.

FIG. 2 is a block diagram illustrating an example set of components of reception unit 52 of FIG. 1 in greater detail. In this example, reception unit 52 includes OTA broadcast middleware unit 100, DASH client 110, and media application 112.

OTA broadcast middleware unit 100 further includes OTA broadcast reception unit 106, cache 104, and proxy server 102. In this example, OTA broadcast reception unit 106 is configured to receive data via an OTA broadcast, e.g., via an Advanced Television Systems Committee (ATSC) broadcast. That is, OTA broadcast reception unit 106 may receive files via broadcast from, e.g., broadcast source device 60.

As OTA broadcast middleware unit 100 receives data for files, OTA broadcast middleware unit 100 may store the received data in cache 104. Cache 104 may comprise a computer-readable storage medium, such as flash memory, a hard disk, RAM, or any other suitable storage medium.

Proxy server 102 may act as a proxy server for DASH client 110. For example, proxy server 102 may provide a MPD file or other manifest file to DASH client 110. Proxy server 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from proxy server 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to proxy server 102. Proxy server 102 may retrieve requested data from cache 104 and provide the data to DASH client 110 in response to such requests.

After receiving a segment, DASH client 110 may pass data of the segment to media application 112. DASH client 110 may process the segment, e.g., to extract media data from the segment and/or to discard data that is unusable by media application 112. In some examples, DASH client 110 may be implemented as an extension to a web browser, and media application 112 may be implemented as a video and/or music playing application.

In accordance with the techniques of this disclosure, as discussed in greater detail below, OTA broadcast reception unit 106 may receive aggregated session description data for a plurality of sessions that transport media data related to common media content as part of an OTA broadcast. OTA broadcast reception unit 106 may extract media data from the OTA broadcast based on the aggregated session description data, and store the extracted media data to cache 104. OTA broadcast reception unit 106 may, for example, extract a subset of the media data that is useful to DASH client 110 and/or media application 112. For example, if configuration data for client device 40 indicates that the client device is not capable of displaying three-dimensional (3D) video data, OTA broadcast reception unit 106 may avoid extracting 3D video data from the OTA broadcast, and instead, extract two-dimensional video data from the OTA broadcast.

Figure 3:
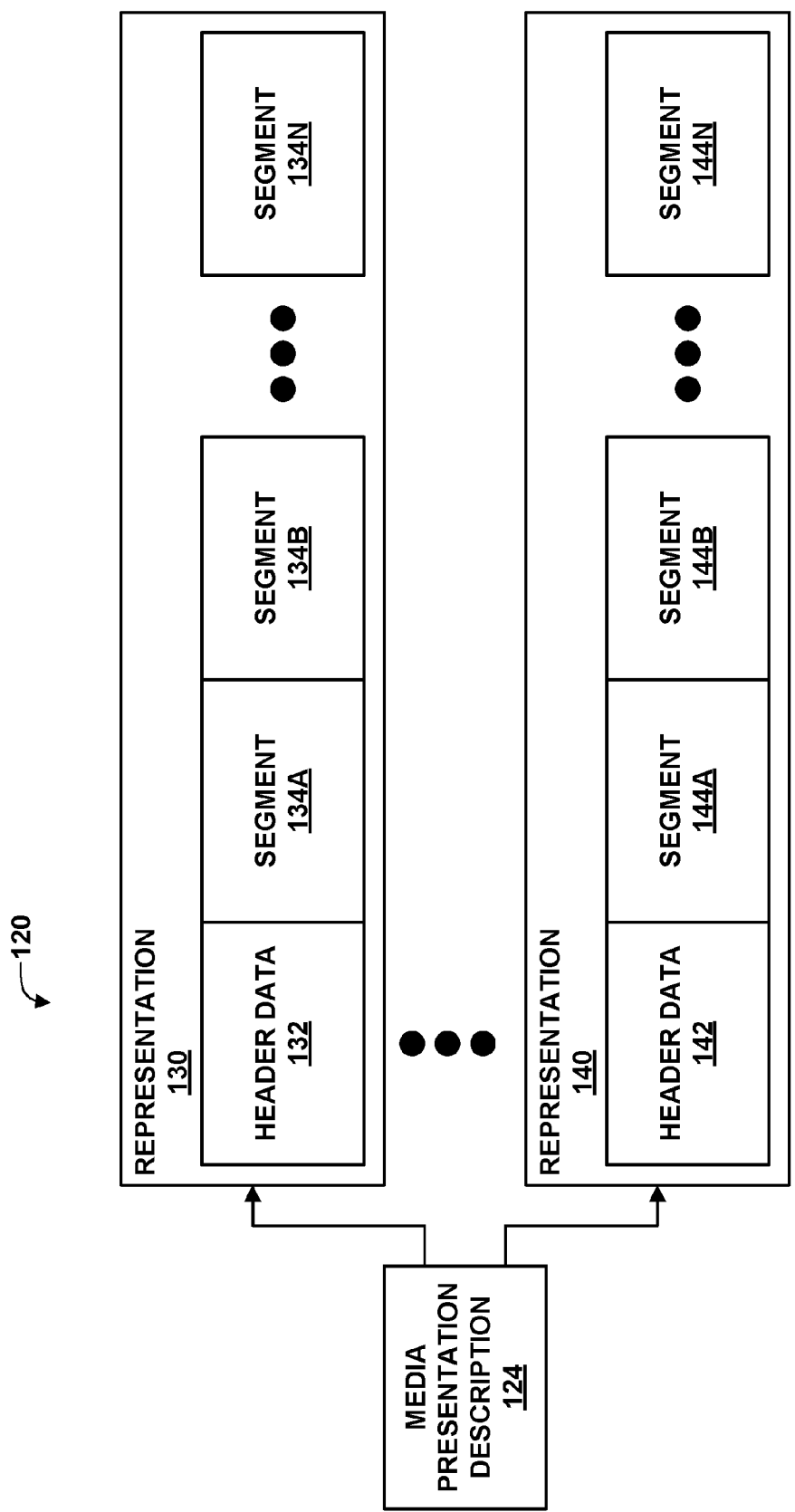
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in memory 62. In the example of FIG. 3, multimedia content 120 includes media presentation description (MPD) 124 and a plurality of representations 130-140. Representation 130 includes optional header data 132 and segments 134A-134N (segments 134), while representation 140 includes optional header data 142 and segments 144A-144N (segments 144). The letter N is used to designate the last movie fragment in each of representations 130, 140 as a matter of convenience. In some examples, there may be different numbers of movie fragments between representations 130, 140.

MPD 124 may comprise a data structure separate from representations 130-140. MPD 124 may correspond to manifest file 66 of FIG. 1. Likewise, representations 130-140 may correspond to representations 68 of FIG. 1. In general, MPD 124 may include data that generally describes characteristics of representations 130-140, such as coding and rendering characteristics, adaptation sets, a profile to which MPD 124 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 132, when present, may describe characteristics of segments 134, e.g., temporal locations of random access points (RAPs, also referred to as stream access points (SAPs)), which of segments 134 includes random access points, byte offsets to random access points within segments 134, uniform resource locators (URLs) of segments 134, or other aspects of segments 134. Header data 142, when present, may describe similar characteristics for segments 144. Additionally or alternatively, such characteristics may be fully included within MPD 124.

Segments 134, 144 include one or more coded video samples, each of which may include frames or slices of video data. Each of the coded video samples of segments 134 may have similar characteristics, e.g., height, width, and bandwidth requirements. Such characteristics may be described by data of MPD 124, though such data is not illustrated in the example of FIG. 3. MPD 124 may include characteristics as described by the 3GPP Specification, with the addition of any or all of the signaled information described in this disclosure.

Each of segments 134, 144 may be associated with a unique uniform resource locator (URL). Thus, each of segments 134, 144 may be independently retrievable using a streaming network protocol, such as DASH. In this manner, a destination device, such as client device 40, may use an HTTP GET request to retrieve segments 134 or 144. In some examples, the media player client of reception unit 52 may use HTTP partial GET requests to retrieve specific byte ranges of segments 134 or 144.

In accordance with the techniques of this disclosure, data of MPD 124, in some examples, may be included in aggregated session description data for a plurality of sessions, where the aggregated session description data may be sent out-of-band relative to the media data of the plurality of sessions. Alternatively, data of MPD 124 may be sent in-band with the sessions. Each of the plurality of sessions may include media data for a respective one of representations 130-140.

Figure 4:
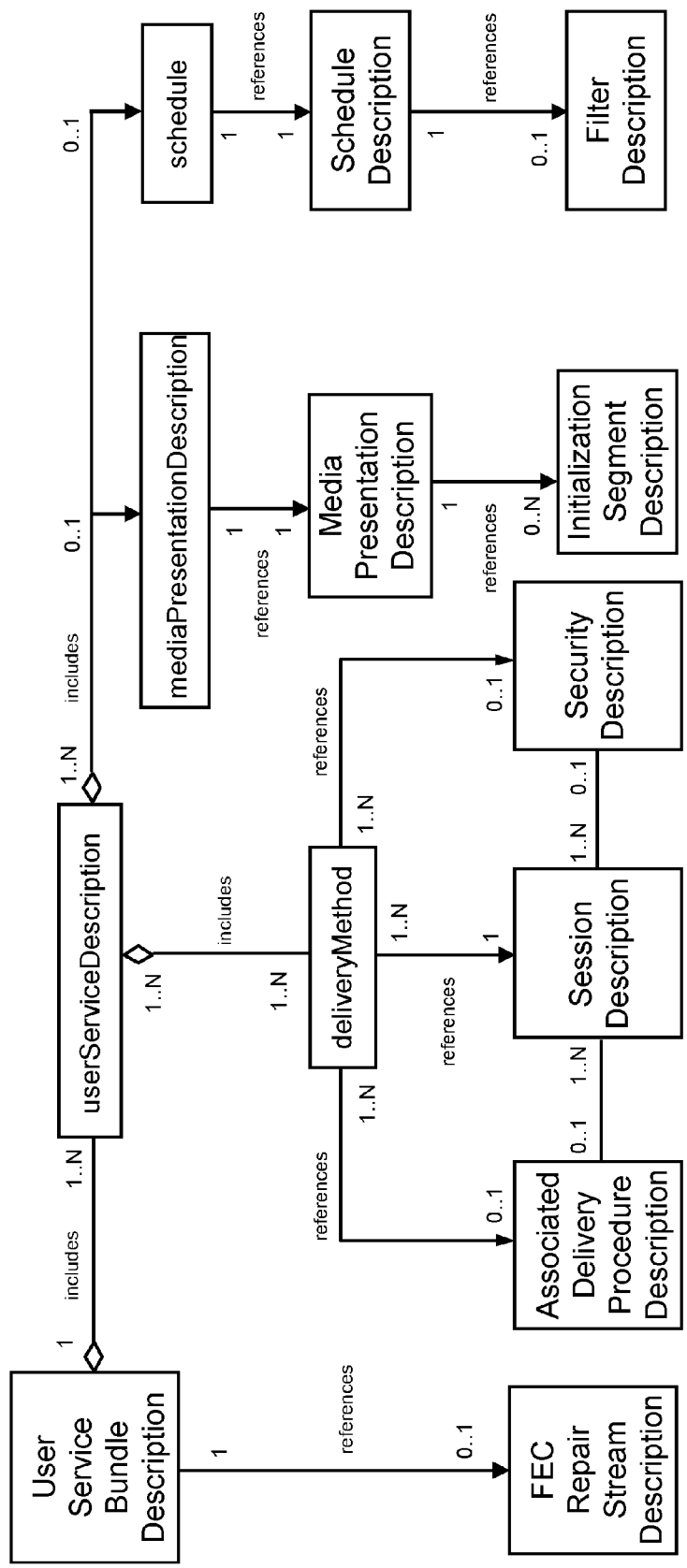
FIG. 4 is a block diagram illustrating an example component coupling diagram representative of metadata provided for a bundle of services.

FIG. 4 is a block diagram illustrating an example component coupling diagram representative of signaling metadata provided for a bundle of services, e.g., delivered over a plurality of multicast IP communication channels/sessions. FIG. 4 is shown for purposes of contrast with respect to FIG. 5. The data represented in FIG. 4 would typically be transmitted for a plurality of channels/sessions using conventional techniques. That is, for each session, a session description is sent in accordance with the techniques of FIG. 4. FIG. 4 represents an example multimedia broadcast multicast service (MBMS) Data Model.

Figure 5:
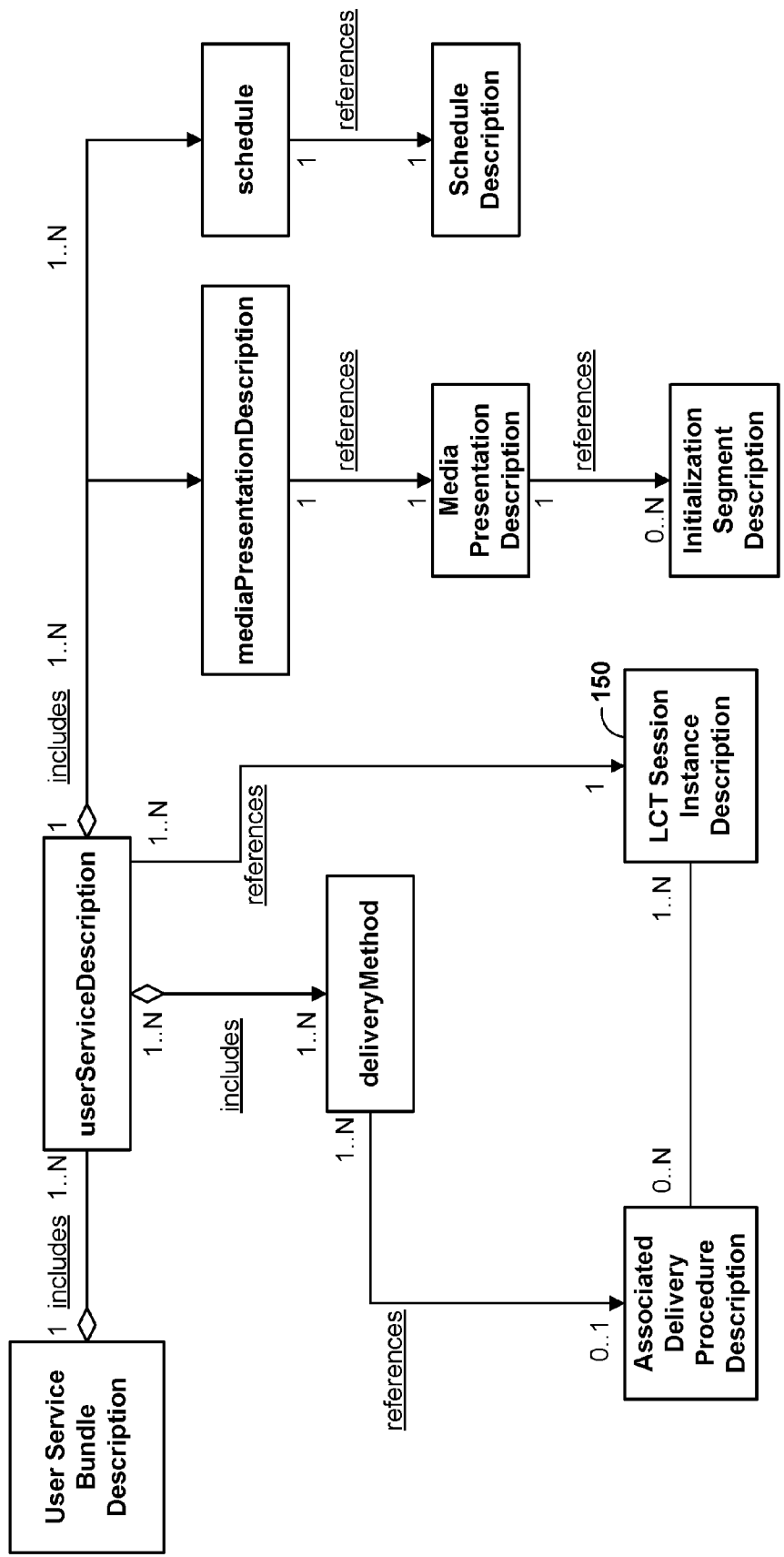
FIG. 5 is a block diagram illustrating an example component coupling diagram representative of metadata exchanged in accordance with the techniques of this disclosure.

FIG. 5 is a block diagram illustrating an example component coupling diagram representative of signaling metadata for a bundle of services delivered from the broadcast source device 60 and the client device 40, in accordance with the techniques of this disclosure. FIG. 5 represents an example of a service layer signaling (SLS) data model. As shown in FIG. 5, rather than sending a plurality of session descriptions (e.g., session description protocol (SDP) data) separately for each session, as shown in FIG. 4, a single layered coding transport (LCT) session instance description (LSID) fragment 150 is transmitted for a plurality of sessions. LSID fragment 150 includes data for each of the plurality of sessions. LSID fragment 150 represents an example of aggregated session description data for a plurality of sessions in accordance with the techniques of this disclosure.

A userServiceDescription@lsidURI attribute may be provided that references LSID fragment 150, which may be identified by metadataEnvelope.item@metadataURI.

The mediaPresentationDescription and associated objects Media Presentation Description and Initialization Segment Description are optional, because the MPD and initialization segment (IS) may be delivered in band with the corresponding media data. However, the LSID may be delivered by broadcast unit 74 to client device 40 out of band from the media data, in accordance with the techniques of this disclosure.

As noted above, LSID fragment 150 may include data that describes a plurality of sessions. For instance, each of the various sessions may deliver data of a corresponding elementary stream, which may include video data, audio data, timed text data, or the like.

In this manner, LSID fragment 150 may replace Session Description fragments for a given User Service, as shown in FIG. 4. The Session Description fragments may be referenced by a deliveryMethod instance, as shown in FIG. 4. LSID fragment 150 may contain aggregated SDP information for all ROUTE/LCT sessions belonging to the corresponding service. The deliveryMethod element is retained for child elements bcAppSvc and ucAppSvc, whose basePattern(s) may be used to determine transport mode(s) of the requested Representation (by its Segment URLs).

LSID fragment 150 may contain appropriate Application-Identifier values for each source flow, such as a Representation-ID to unambiguously identify the LCT sessions (and their session parameters) that carry the Representations selected by the DASH client for the service of interest to the user. There may be a one-to-one association between LSID and MPD, regardless of whether the MPD is carried as a metadata fragment (e.g., within the aggregated session description data) or delivered in band with Media Segments.

The logical association between the Associated Delivery Procedure Description (ADPD) and LSID fragment 150 may be as follows: for each LSID, there can be zero, one, or multiple ADPDs, which describe File Repair (FR) and Reception Reporting (RR) procedures, within the Associated Delivery Procedure Description, for contents carried on the LCT sessions described by the LSID (multiple case when separate ADPDs apply to subsets of LCT sessions described by the LSID). Hence, there may be a 1 to 0 . . . N relationship from the LSID to ADPD(s). Each ADPD instance may also apply to one or more LSID instances, hence the 1 to 1 . . . N relationship going from ADPD to LSID.

The example SLS Data Model of FIG. 5 has some similarities to the MBMS Data Model of FIG. 4. In the example of FIG. 5, like in the example of FIG. 4, the user service bundle description (USBD) fragment is a top level metadata fragment for discovery of available User Services, and provides references to other metadata fragments to enable service acquisition. The data model of FIG. 5 also reuses many existing user service description (USD) fragments, e.g., USBD, ADPD, Schedule, and possibly MPD and/or IS.

However, there are several differences between the example SLS Data Model of FIG. 5 and the example of FIG. 4. For instance, the SLS Data Model of FIG. 5 introduces LSID fragment 150, which describes contents, delivery formats, forward error correction (FEC) mechanisms, and access information for all ALC/LCT sessions in which content components of a single User Service are delivered.

LSID fragment 150 contains session information to enable access to delivery objects/object flows carried on each LCT session of a service. LSID fragment 150 also includes embedded FDT parameters or references FDT parameters when the source protocol operates in File Mode. LSID fragment 150 may contain other information for identifying and managing the reception of the delivery object or object flow.

In addition, certain fragments of the example of FIG. 4 are omitted from the SLS Data Model of FIG. 5. For example, the Session Description fragments are omitted. The functionality of the Session Description fragments is instead subsumed by LSID fragment 150 (which may include additional parameters not originally specified in the ROUTE submission to ATSC). The FEC Repair Stream Description is also omitted, again because its functionality may be provided by the LSID. The Security Description is not applicable to ATSC 3.0, and may not be applicable to other OTA broadcast standards. The Filter Description is not necessary for basic service access, although may be retained in some examples, e.g., to support personalization or targeting requirements. The MPD and/or IS fragments may be optional in the SLS Data Model, because these will likely also be delivered in band with the media Segments themselves.

Furthermore, there may be profile/constraints to equivalent USD fragments. For example, the ADPD may contain only file repair functionality, but no reception reporting or consumption reporting.

Given LSID fragment 150, certain SDP parameters for an LCT session may be retained, such as session start and end time (which might not present in LSID fragment 150). The Sender IP address, Destination IP address and UDP port number may also be retained, as service components may be carried in multiple ROUTE sessions. The data rate using SDP bandwidth modifiers may also be retained, because they may be useful to the receiver for allocating a necessary buffer size for reception of the LCT session. Such data, alone or in any combination, may also be signaled in LSID fragment 150 or another fragment.

However, the number of channels in a session is unnecessary (the default is equal to one). The TSI is unnecessary because it may be provided by LSID fragment 150. Protocol ID can be omitted, because its default value is ROUTE/UDP. The media type(s) and format list are duplicative of information provided in the MPD, and may therefore be omitted. The mode of MBMS bearer per media is unnecessary, because such MBMS-specific data is not relevant to OTA broadcasts, such as ATSC. FEC capabilities and related parameters are signaled in LSID fragment 150 and therefore may be omitted. Furthermore, service language(s) per media data may be omitted, because it is duplicative of the @lang parameter of the MPD.

Figure 6A:
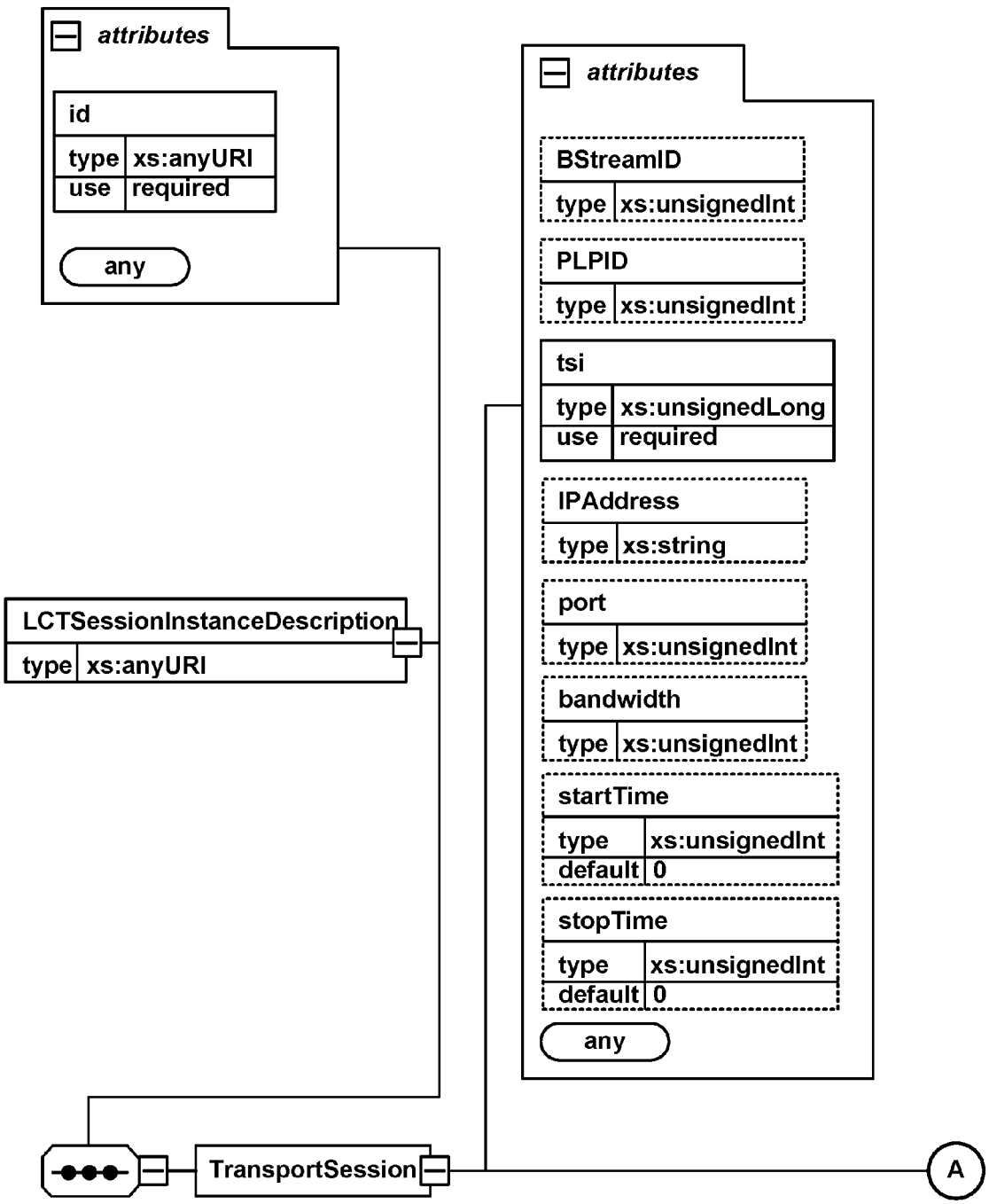
FIGS. 6A-6C are conceptual diagrams illustrating an example layered coding transport (LCT) Session Instance Description (LSID) schema.
Figure 6B:
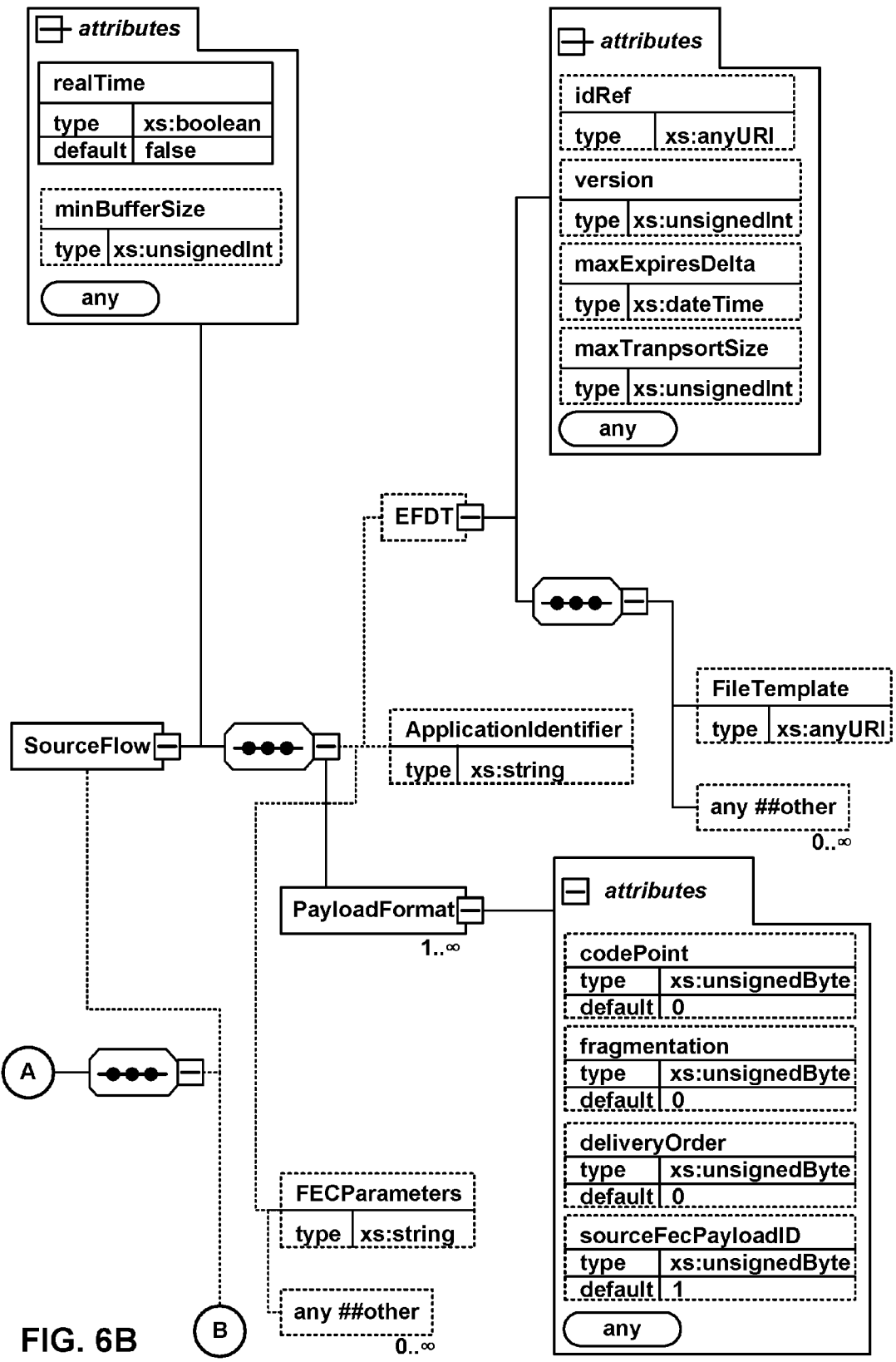
Figure 6C:
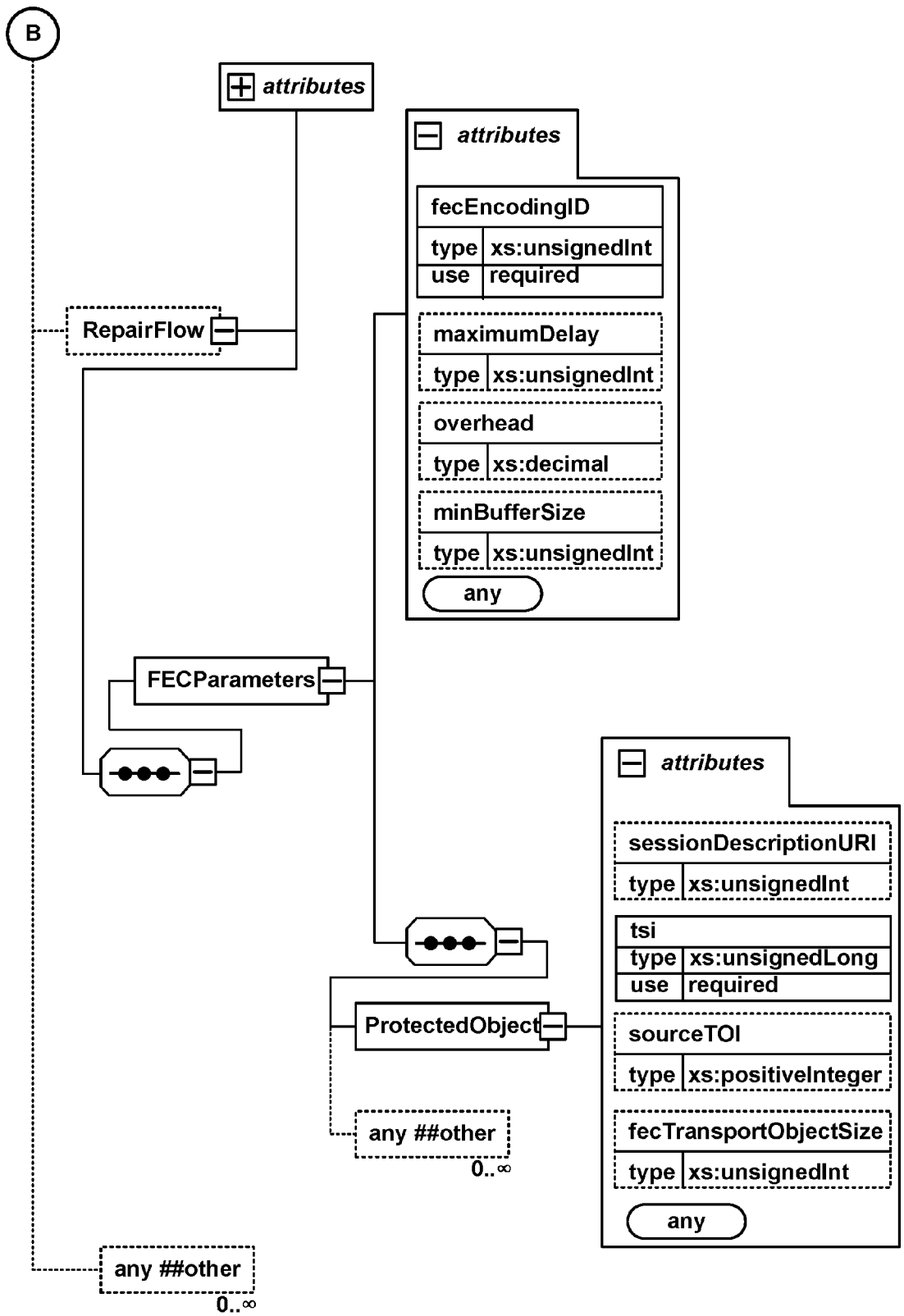

FIGS. 6A-6C are conceptual diagrams illustrating an example LSID schema for LSID fragment 150. Table 1 below is an example of data that may be included in an LSID according to the LSID schema of FIGS. 6A-6C:

TABLE 1

| Element or Attribute Name | Use | Description |
| --- | --- | --- |
| LSID | | LCT Session Instance Description |
| @id | M | Identifier of the LSID instance, whose value may be the same as userServiceDescription@serviceId in the User Service Bundle Description fragment, to which this LSID metadata fragment pertains |
| TransportSession | 1 . . . N | Provides information about the LCT transport sessions which carry the source and/or repair flows associated with the content components of the user service. |
| @BStreamID | 0 . . . 1 | Identifier of the Broadcast Stream in which the contents of this LCT session are carried. |
| @PLPID | 0 . . . 1 | Identifier of the PLP (physical layer pipe) within the Broadcast Stream identified by @BPStreamID in which the contents of this LCT session are carried. |
| @tsi | M | Specifies the transport session identifier of the associated source and/or repair flow. The value must not be 0. |
| @senderIPAddress | O | Specifies the IP address of the sender of the ROUTE session and therefore the child LCT transport session which scopes the TSI. This attribute is optional when the parent ROUTE session is the same ROUTE session to which the LCT session, carrying the SLS fragments for this user service (including this LSID fragment), belongs. |
| @destIPAddress | O | Specifies the destination IP address of the ROUTE session in which the source flow and/or repair flow carried by this LCT session is contained. This attribute is optional when the parent ROUTE session is the same ROUTE session to which the LCT session, carrying the SLS fragments for this user service (including this LSID fragment), belongs. |
| @port | O | Specifies the destination UDP port of the ROUTE session in which the source flow |

TABLE 1-continued

| Element or Attribute Name | Use | Description |
|---|---|---|
| | | and/or repair flow carried by this LCT session is contained. This attribute is optional when the parent ROUTE session is the same ROUTE session to which the LCT session, carrying the SLS fragments for this user service (including this LSID fragment), belongs. |
| @bandwidth | O | Specifies the maximum bit-rate required by this LCT session and represents the largest sum of the sizes of all packets transmitted during any one second long period of the session, expressed as kilobits. |
| @startTime | OD default = 0 | Specifies the start time of this LCT session as represented by the 32-bit integer part of an NTP time stamp. If this attribute is not present or is set to "0", and @endTime is also "0", then the session is regarded as permanent. |
| @endTime | OD default = 0 | Specifies the end time of this LCT session as represented by the 32-bit integer part of an NTP time stamp. If this attribute is not present or is set to "0", then the session is not bounded, although it will not become active until after the start time. |
| SourceFlow | 0 . . . 1 | Provides information of a source flow carried on this tsi |
| @realtime | OD default: false | If not present it is false. If present and set to true, LCT packets contain extension headers including NTP timestamps that express the presentation time of the included delivery object. |
| @minBufferSize | O | Defines the maximum amount of data that needs to be stored in the receiver. This value may be present if @realtime is set to true. |
| EFDT | 0 . . . 1 | If provided, it specifies the details of the file delivery data. This is the extended FDT instance.<br>The EFDT may either be embedded or may be provided as a reference. If provided as a reference the EFDT may be updated independently of the LSID.<br>If referenced, it shall be delivered as in-band object on TOI = 0 of the included source flow. |
| route:@idRef | 0 . . . 1 | Identification of the EFDT, it can be represented as a URI by the corresponding Transport Session. |
| @route:version | O | Version of this extended FDT instance descriptor. The version if increased by one when the descriptor is updated. The received EFDT with highest version number is the currently valid version. |
| @route:maxExpiresDelta | O | The maximum expiry time for an object in the Transport Session after sending the first packet associated to this object. |
| @route:maxTransportSize | O | The maximum transport size of any object described by this EFDT. Shall be present if not present in FEC_OTI. |
| route:FileTemplate | 0 . . . 1 | Specifies the file URL or file template in the body. |
| ApplicationIdentifier | 0 . . . 1 | May provide additional information that can be mapped to the application that is carried in this transport session, e.g. Representation ID of a DASH [14] content or the Adaptation Set parameters of a DASH [14] Representation in order to select the LCT transport session for rendering.<br>This element shall be present when the contents of the user service associated with the source flow are DASH-formatted. |
| PayloadFormat | 1 . . . N | Defines payload formats of ROUTE packets carrying the objects of the source flow |
| @codePoint | OD default = 0 | Defines what CodePoint value is used for this payload. This is the value of the CP field in the LCT header. When signalling |

TABLE 1-continued

| Element or Attribute Name | Use | Description |
| --- | --- | --- |
| @deliveryFormatID | M | this this value, the delivery of the object shall follow the rules below. Specifies the payload format of the delivery object. For details see below. |
| @fragmentation | OD default = 0 | 0: arbitrary<br>1: application specific (sample based)<br>2: application specific (e.g. a collection of boxes) |
| @deliveryOrder | OD default = 0 | 0: arbitrary<br>1: in-order delivery<br>2: in-order delivery of media samples and prior to movie fragment box |
| @sourceFecPayloadID | OD default = 1 | Defines the format of the Source FEC Payload ID. The following values are defined:<br>0: the source FEC payload ID is absent and the entire delivery object is contained in this packet. The FECParameters shall be absent.<br>1: the source FEC payload ID is 32 bit and expresses the start offset in the object. The FECParameters shall be absent.<br>2: the FECParameters defines the Format of the Source FEC Payload ID. |
| FECParameters | 0 . . . 1 | Defines the parameters of the FEC scheme associated with the source flow, in the form of FEC Object Transmission Information as defined in RFC 5052. The FEC parameters are applied to the Source FEC Payload ID value specified in the ROUTE packet header. |
| RepairFlow | | defines a repair flow in session |
| FECParameters | | FEC Parameters (better structuring may be suitable necessary) |
| @fecEncodingId | M | specifies the applied FEC scheme. |
| @maximumDelay | O | specifies the maximum delivery delay between any source packet in the source flow and the repair flow. |
| @overhead | O | specifies the overhead in percentage |
| @minBufferSize | O | specifies the required buffer size. If present then this attribute defines the minimum buffer size that is required to handle all associated objects that are assigned to a super-object. |
| FECOTI | 1 | specifies the FEC Object Transmission Information (FEC OTI) as defined in RFC 5052. FEC OTI corresponds to FEC related information associated with an object as well as FEC information associated with the encoding symbols of the object is to be included within this declaration and applies to all repair packets with the repair flow. |
| ProtectedObject | 0 . . . N | specifies the source flow protected by the this Repair Flow and the details on how the protection is done. It also defines how certain delivery objects of a collection of objects are included in the repair flow. |
| @sessionDescription | O | specifies the session description information for the Source Flow, in the form of a comma-separated string containing one or more attributes as defined under the LSID.TransportSession element. If not present, the source flow is contained in the same session as the repair flow. |
| @tsi | M | specifies transport session identifier for the source flow to be protected. |
| @sourceTOI | O | specifies the TOI of the delivery object corresponding to the TOI included in the repair flow. For details see Section 7.3.3. If not present, the source TOI is the same as the repair TOI. |
| @fecTransportObjectSize | O | specifies the default size of each FEC transport object, in units of symbols. If not |

TABLE 1-continued

| Element or Attribute Name | Use | Description |
| --- | --- | --- |
| | | present then these values shall be provided in the repair packets using the EXT_TOL header. If present, the EXT_TOL header shall not be present. |

Legend:
For attributes: M = Mandatory, O = Optional, OD = Optional with Default Value, CM = Conditionally Mandatory. It will be appreciated, however, that the attributes labelled "M" or "CM" above may be omitted in some embodiments, if desired.
For elements: <minOccurs> . . . <maxOccurs> (N = unbounded)
Elements are bold; attributes are non-bold and preceded with an @

LSID fragment 150 may include any or all of the data of Table 1, in accordance with the example of FIGS. 6A-6C. OTA broadcast reception unit 106 of reception unit 52 of client device 40 may receive LSID fragment 150. Accordingly, OTA broadcast reception unit 106 may receive: an identifier element that references a corresponding user service description (USD) identifier element; one or more broadcast stream identifier elements that identify broadcast streams corresponding to the plurality of sessions; one or more sender IP address elements that specify IP addresses for senders of the broadcast streams; one or more destination IP address elements that specify IP addresses for destinations of the broadcast streams; one or more port elements that specify destination ports for the broadcast streams; one or more physical layer packet (PLP) ID elements that specify identifiers for the PLP within the broadcast streams; one or more transport session identifier (TSI) elements that specify TSIs of associated source or repair flows for the broadcast streams; one or more bandwidth elements that specify maximum bit-rates for the plurality of sessions; one or more start time elements that specify start times for the plurality of sessions; and one or more end time elements that specify end times for the plurality of sessions.

Similarly, OTA broadcast reception unit 106 may also receive one or more source flow elements, including receiving: one or more real time elements each having a binary value for the plurality of sessions; and, when the real time element for one of the plurality of sessions has a value of true, a minimum buffer size element that describes a buffer size for a transport buffer of a receiver of the one of the plurality of sessions.

Likewise, OTA broadcast reception unit 106 may also receive an extended file delivery table (EFDT) element for one of the plurality of sessions, which may include receiving: an identifier element specifying an identifier for the EFDT; a version element specifying a version of the EFDT; a maxExpiresDelta element specifying a maximum expiry time for an object in the one of the plurality of sessions; a maxTransportSize element specifying a maximum transport size of any object described by the EFDT; and a file template element specifying a file uniform resource locator (URL) or a file template for a file of the one of the plurality of sessions.

Furthermore, OTA broadcast reception unit 106 may also receive a payload element, including receiving: a codepoint element specifying a CodePoint value used for the payload element; a delivery format identifier element specifying a payload format for the payload element; a fragmentation element having a value indicating arbitrary, application specific (sample based), or application specific (collection of boxes); a delivery order element having a value indicating arbitrary, in-order delivery, or in-order delivery of media samples and prior to movie fragment box; and a source forward error correction (FEC) payload identifier element having a value that indicates one of: a source FEC payload identifier is absent and an entire delivery object is contained in a corresponding packet, the source FEC payload identifier is a thirty-two bit value and expresses a start offset for the delivery object, or that a FEC parameters element defines a format for the source FEC payload identifier.

Additionally, OTA broadcast reception unit 106 may also receive a repair flow element, including receiving: one or more forward error correction (FEC) parameters, including receiving one or more of: a maximum delay element specifying a maximum delivery delay between any source packet in a source flow and a corresponding repair flow, an overhead element specifying overhead as a percentage value, or a minimum buffer element specifying a required buffer size; one or more FEC object transmission information (FECOTI) elements; and a protected object element that specifies a source flow protected by a repair flow corresponding to the repair flow element.

Figure 7:
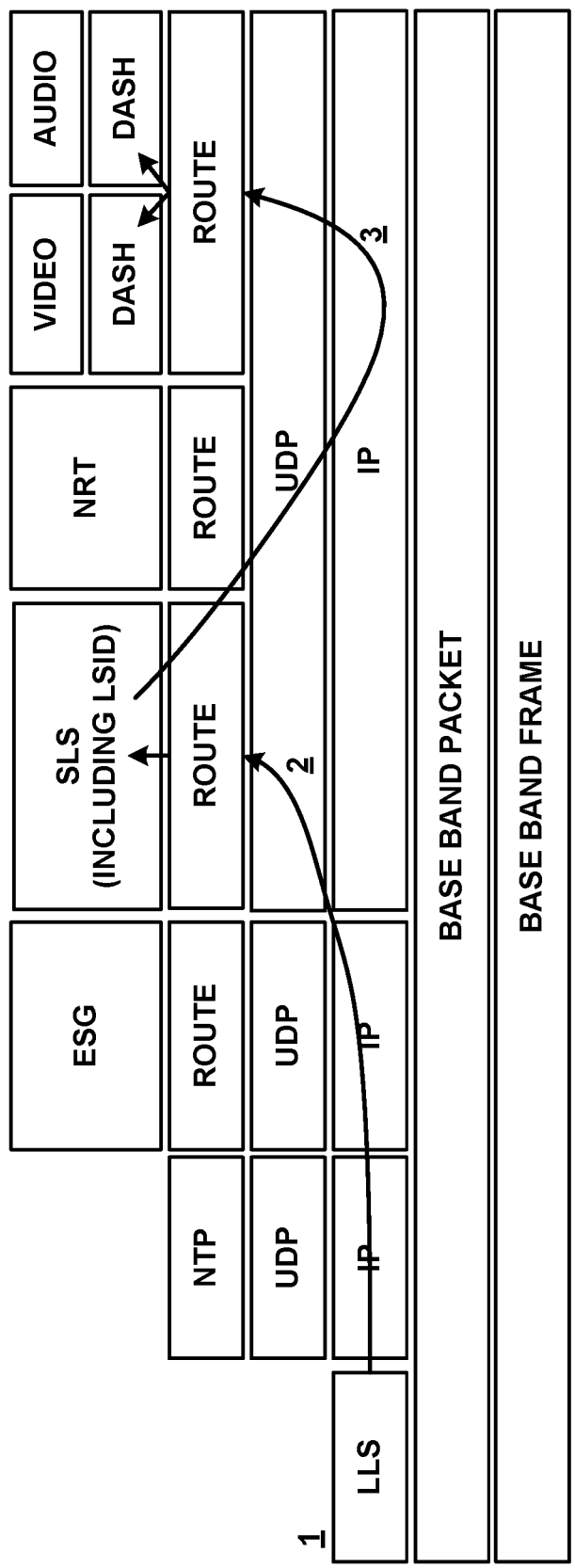
FIG. 7 is a flow diagram illustrating an example process for discovery and access of a high level service.

FIG. 7 is a flow diagram illustrating an example process for discovery and access of a high level service. In particular, FIG. 7 illustrates various layers of data and a general order in which the data may be processed to perform service discovery. Initially (1), a receiver (such as reception unit 52) stores essential information needed for fast discovery and acquisition from a Lower Layer Signaling (LLS) stream in advance. When user interaction (e.g., direct tuning) occurs, the receiver tunes to the Service Layer Signaling (SLS) stream by using the LLS information shown in FIG. 7, and then acquires the SLS (e.g., USBD, LSID, MPD and Schedule fragments for streaming service access) to select the proper service components (2). The receiver then tunes to the service component streams over ROUTE/LCT sessions and acquires and renders media data of the component streams (3). Lower Layer Signaling (LLS) may include a logical Fast Information Channel (FIC) and Service Configuration Description (SCD) data, together which enable rapid channel scanning by the receiver to build a list of all accessible services along with their channel name, channel number, etc., and provide bootstrap information for the receiver to discover the SLS for each service.

Figure 8:
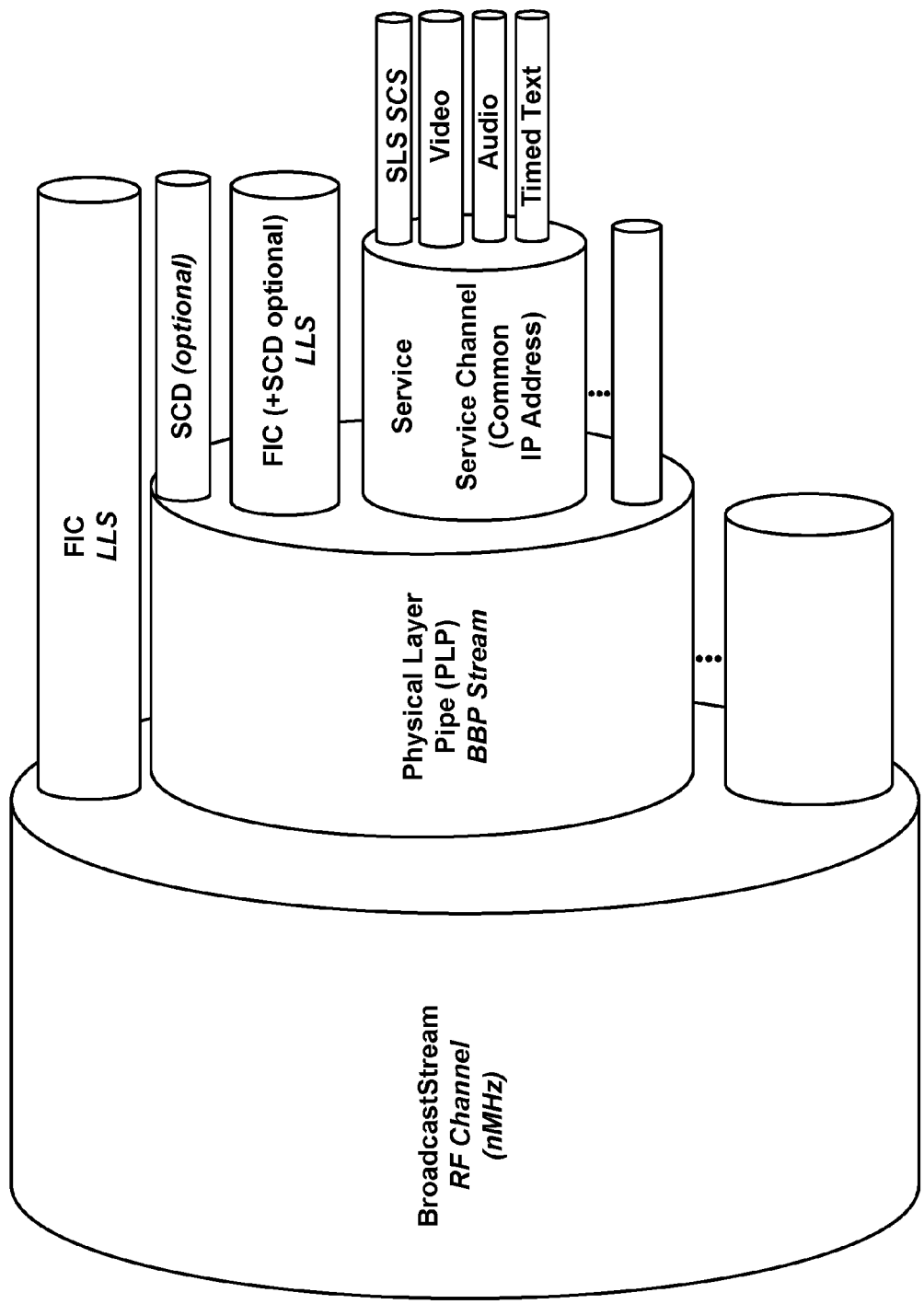
FIGS. 8-10 are conceptual diagrams illustrating examples of pipe models in accordance with the techniques of this disclosure.
Figure 9:
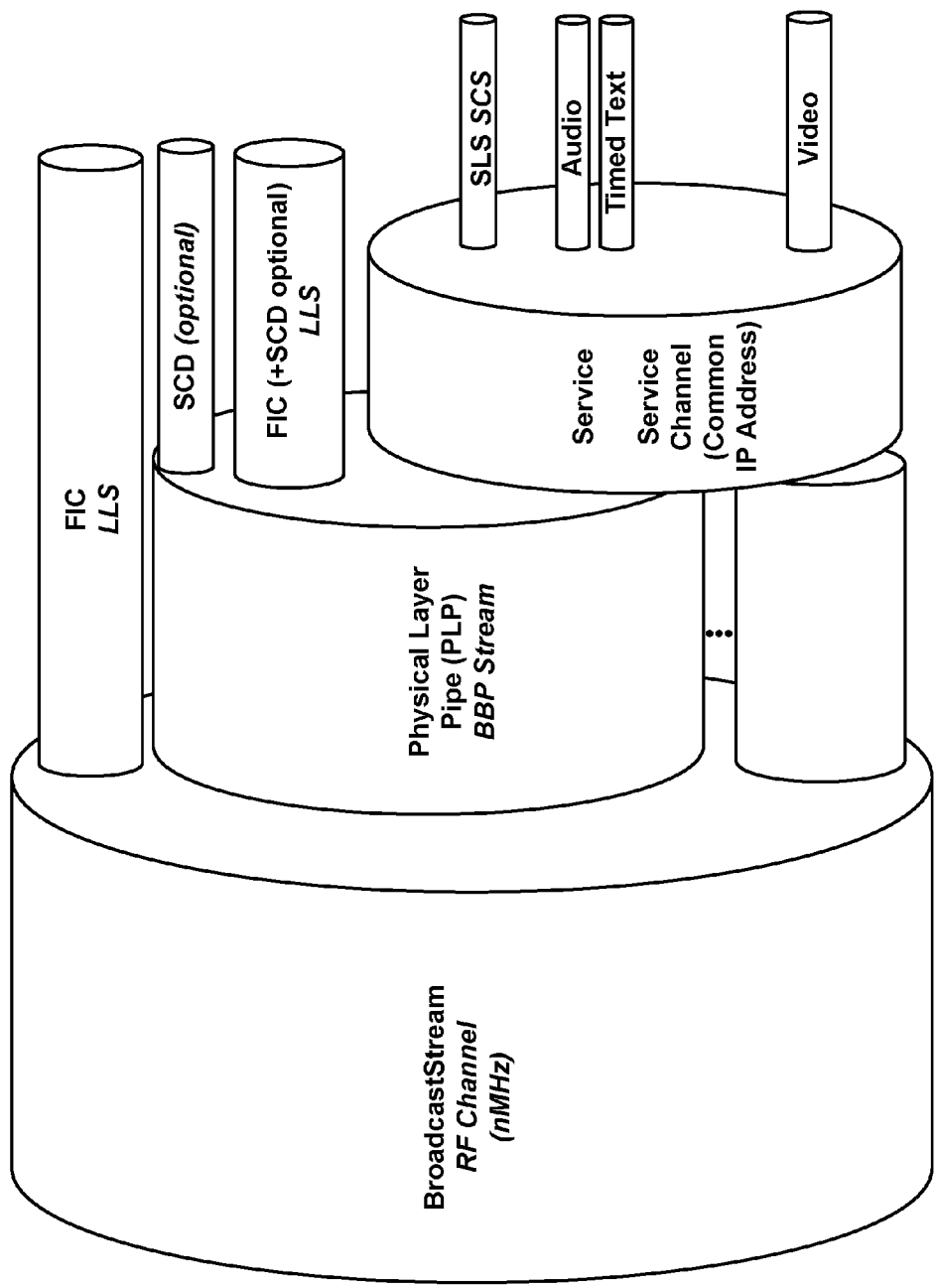
Figure 10:
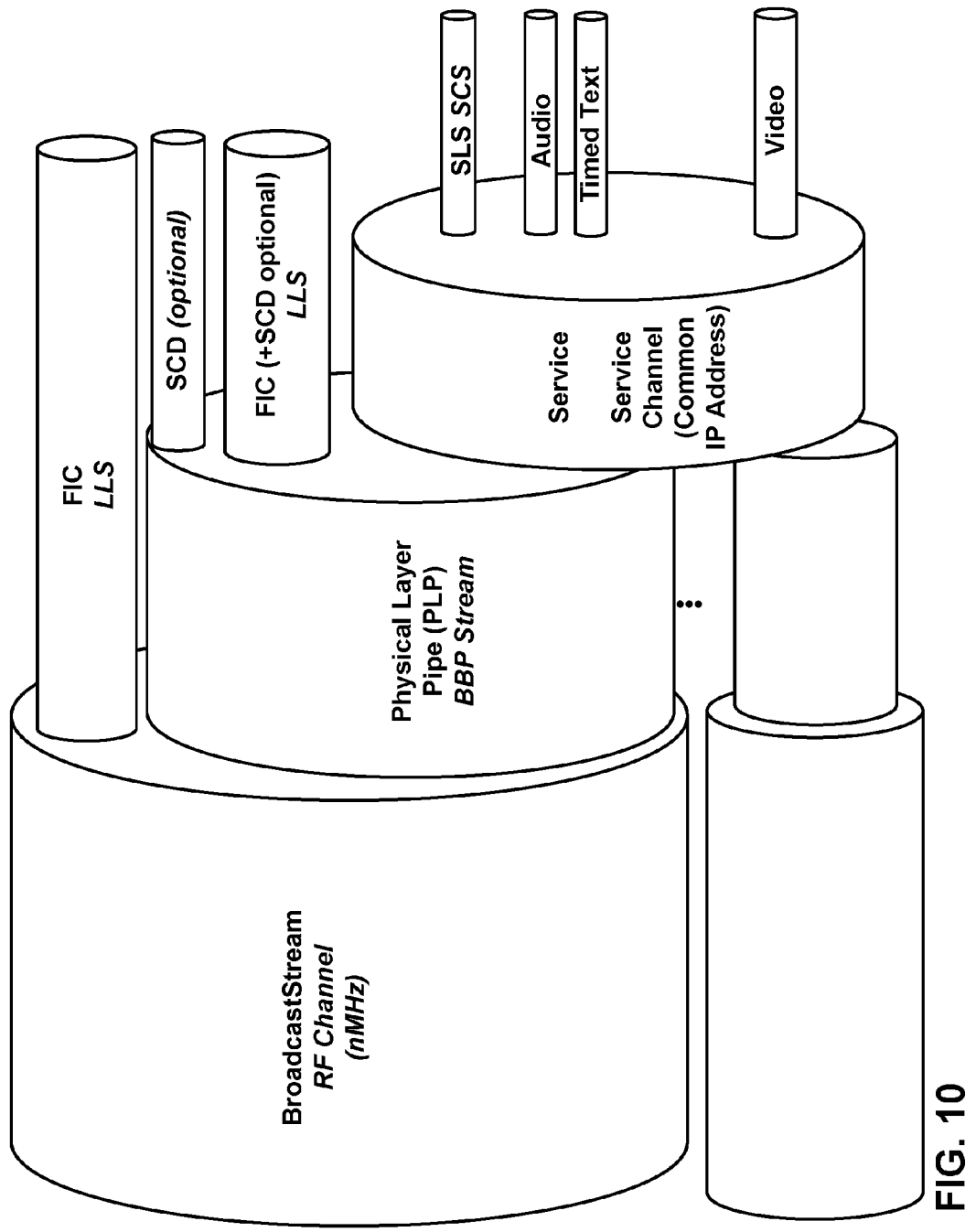

FIGS. 8-10 are conceptual diagrams illustrating examples of pipe models in accordance with the techniques of this disclosure. In general, in FIGS. 8-10, various "pipes" are encapsulated within other pipes. The highest layer pipe is a BroadcastStream, which is a Radio Frequency channel. In FIGS. 8 and 9, a single BroadcastStream encapsulates a baseband packet (PLP) stream at the physical layer. In FIG. 10, multiple BroadcastStreams encapsulate respective streams. In the example of FIG. 8, a service channel (having a common IP address) is entirely encapsulated within a single PLP stream, whereas in the example of FIG. 9, the service channel may span multiple PLP streams. Moreover, in FIG. 10, the service channel may span multiple PLP steams and BroadcastStreams.

The service channel, as a logical broadcast bearer, contains multiple LCT sessions, each of which may carry continuous media streams, e.g., one or more of video, audio, and/or timed text/closed caption (CC) streams, or discrete media such as a text file or a still image, in any combination. One of the LCT sessions in the service channel is dedicated to the delivery of SLS metadata fragments (including the LSID). In the example of FIG. 8, all of the media streams are included within a single Physical Layer Pipe (PLP) stream, whereas in the example of FIG. 9, various media streams may be sent as part of different service channels. Furthermore, in FIG. 10, various media streams may be sent as part of the same service channel that spans multiple PLP streams and, likewise, multiple BroadcastStreams.

Also in the examples of FIGS. 8-10, Fast Information Channel (FIC) data and Service Configuration Description (SCD) data are encapsulated, respectively, within the BroadcastStream and the PLP stream. As an alternative, the FIC and SCD (optionally) are encapsulated together within the PLP stream. Implementations may utilize any of these options, or this data may be encapsulated elsewhere.

Figure 11:
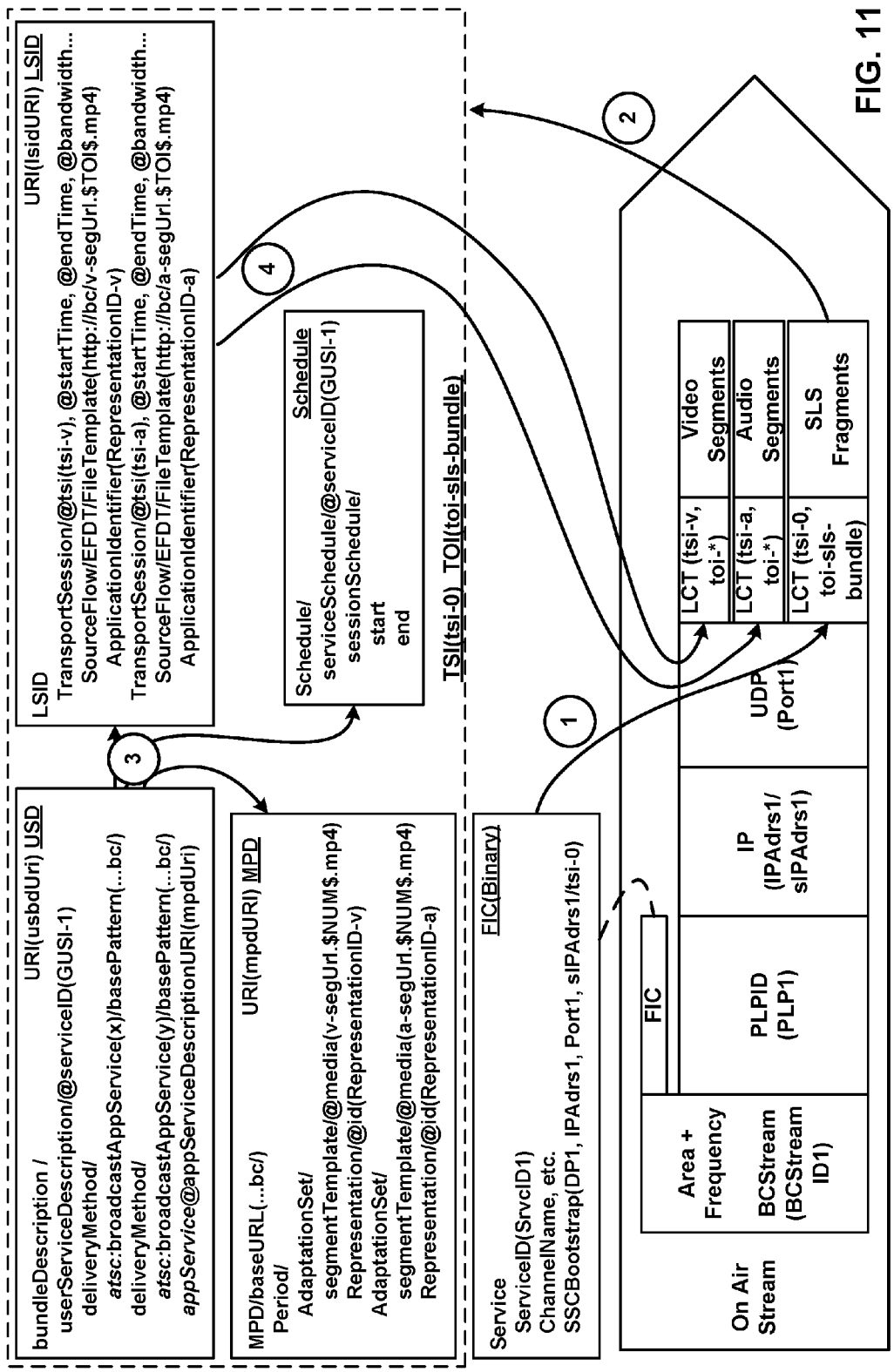
FIG. 11 is a flow control diagram illustrating an example of a detailed service discovery process per the service layer signaling (SLS) Data Model of FIG. 5.

FIG. 11 is a flow control diagram illustrating an example of a detailed service discovery process per the SLS Data Model of FIG. 5. Initially, reception unit 52 acquires FIC data in a scanning phase, and uses the FIC data to identify the LCT channel and transport object that carries service layer signaling data, i.e. (tsi-0 and toi-sls-bundle) data and corresponding SLS Fragments from the On Air Stream (1). Reception unit 52 then uses the SLS fragments to identify the TSI(tsi-0) TOI(toi-sls-bundle) (2). Reception unit 52 then acquires service signaling data carried on the default TSI (TSI=0) and pre-allocated TOI value for the SLS bundle (TOI="toi-sls-bundle") to access the user service description (USD) and in turn the associated the MPD, LSID, and Schedule fragments (3). Identifiers for requested representations of video and audio content identified in the MPD match identifiers for these representations may be in LSID fragment 150. Thus, reception unit 52 may use the LSID information for the requested representations to identify corresponding media data in the On Air Stream (4), e.g., audio and video segments.

Thus, OTA broadcast reception unit 106 of reception unit 52 may use the process of FIG. 11 to identify requested media data (e.g., video representation(s), audio representation(s), and/or timed text/CC representation(s)). OTA broadcast reception unit 106 may cache media data of the requested representations in cache 104 for subsequent extraction by proxy server 102 in response to requests from DASH client 110.

Figure 12:
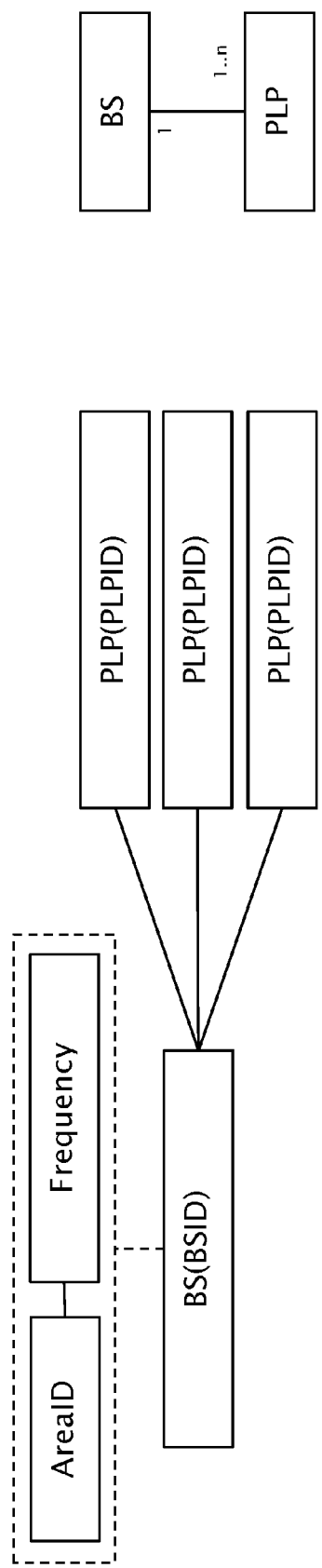
FIG. 12 is a conceptual diagram illustrating an example Bearer Model and Identification.

FIG. 12 is a conceptual diagram illustrating an example Bearer Model and Identification. A "broadcast stream" is substantially similar to a "transport stream" or "RF-Allocation." A broadcast stream (BS) may be identified by a BSID mapped to "AreaID+FrequencyID." The uniqueness of the BS is assumed to be assured by some authority, e.g., the Federal Communications Commission (FCC).

Each Physical Layer Pipe (PLP) is analogous to a "MBMS Bearer," i.e., a logical broadcast channel resource for which a unique modulation and coding scheme (MCS) may be applied to provide differentiated quality-of-service pipes. The PLP may be identified by PLPID, scoped by the corresponding BS.

Figure 13:
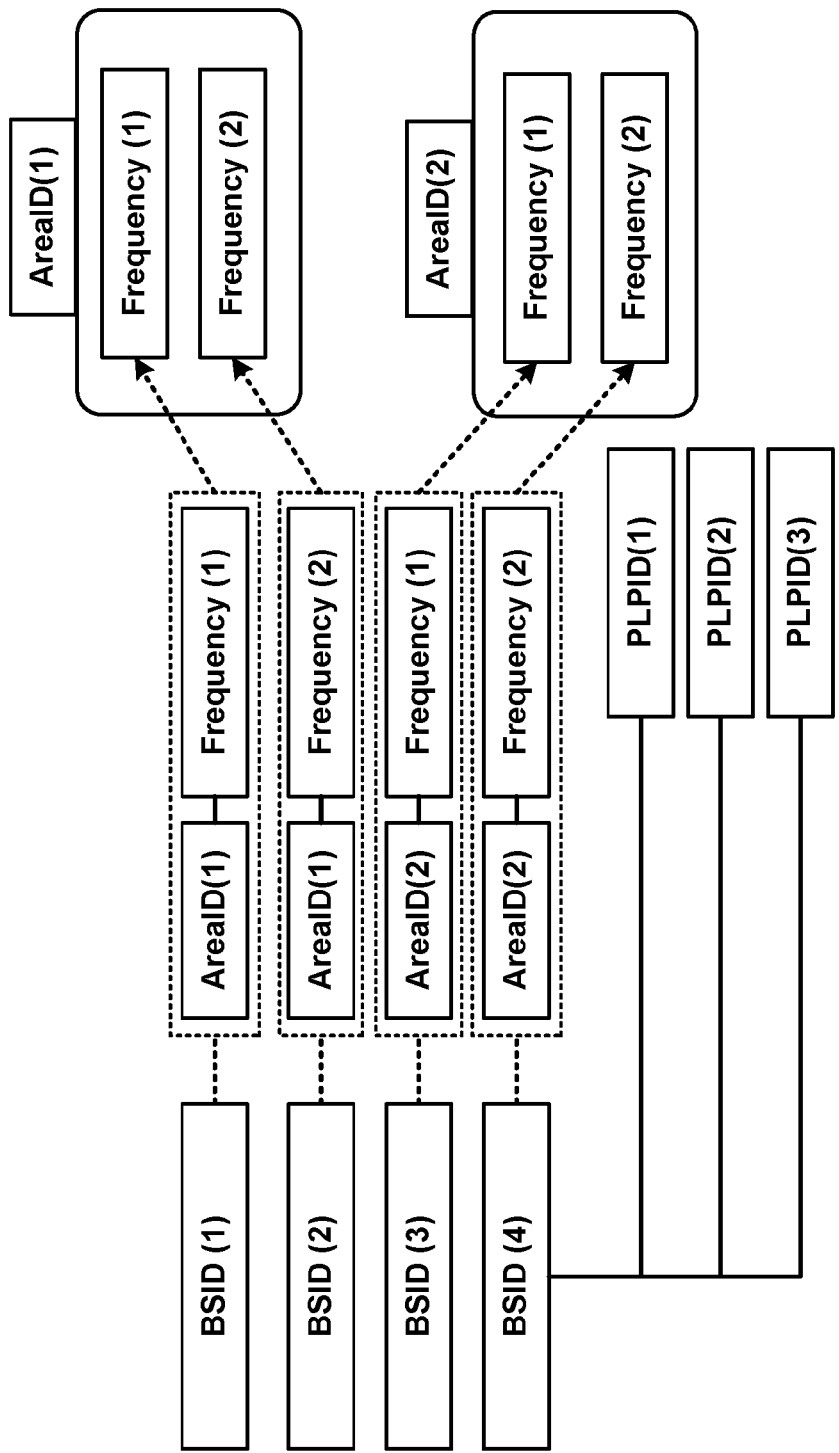
FIG. 13 is a conceptual diagram illustrating additional details of the Bearer Model and Identification of FIG. 12.

FIG. 13 is a conceptual diagram illustrating additional details of the Bearer Model and Identification of FIG. 12. As shown in FIG. 13, BSIDs may be mapped to "AreaID+FrequencyID." The PLP is unique within the scope of the corresponding BS.

Figure 14:
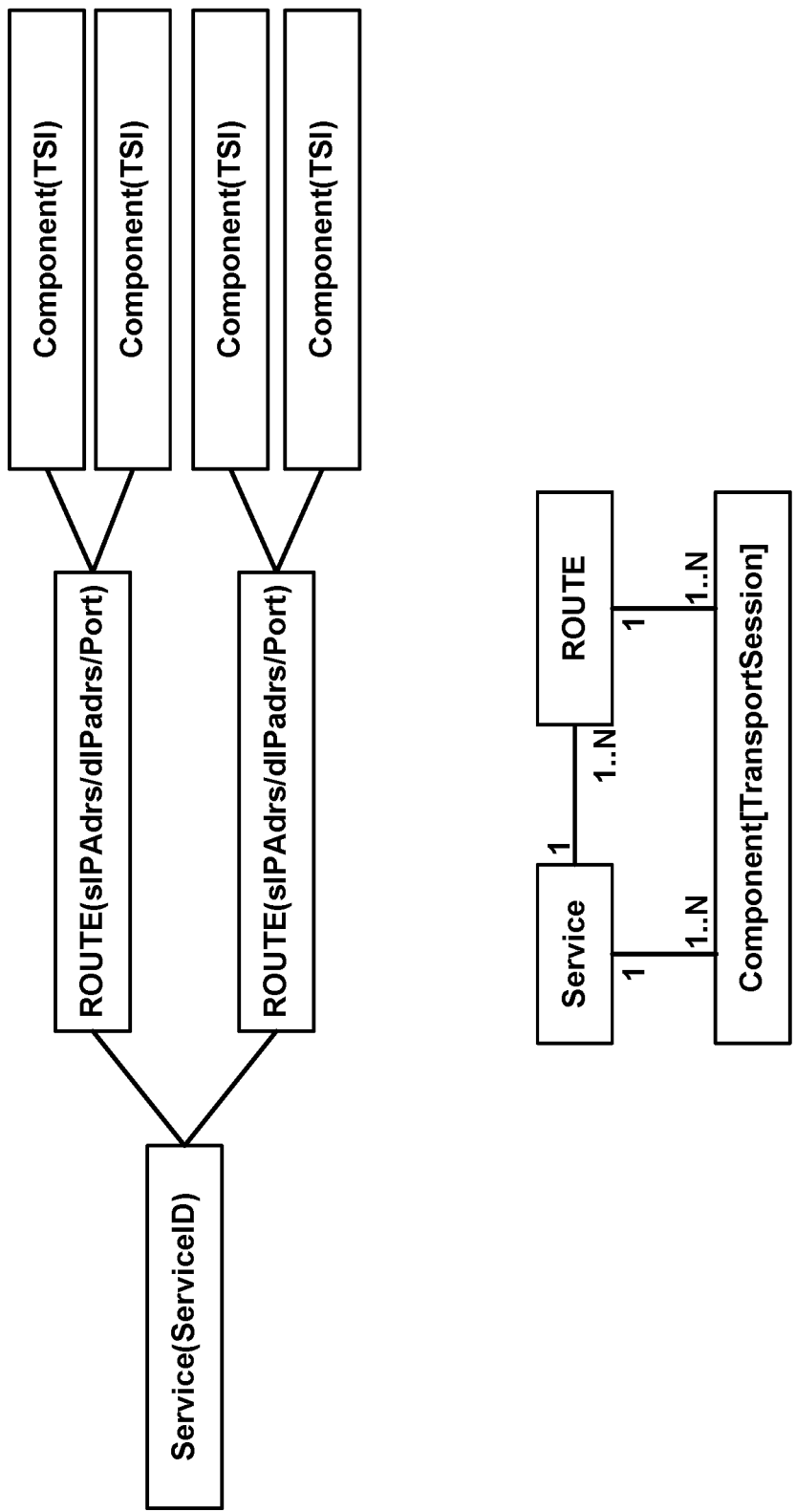
FIG. 14 is a conceptual diagram illustrating an example of service/component, ROUTE session/(LCT) Transport Session Model and identification.

FIG. 14 is a conceptual diagram illustrating an example of service/component, ROUTE session/(LCT) Transport Session Model and identification.

Figure 15:
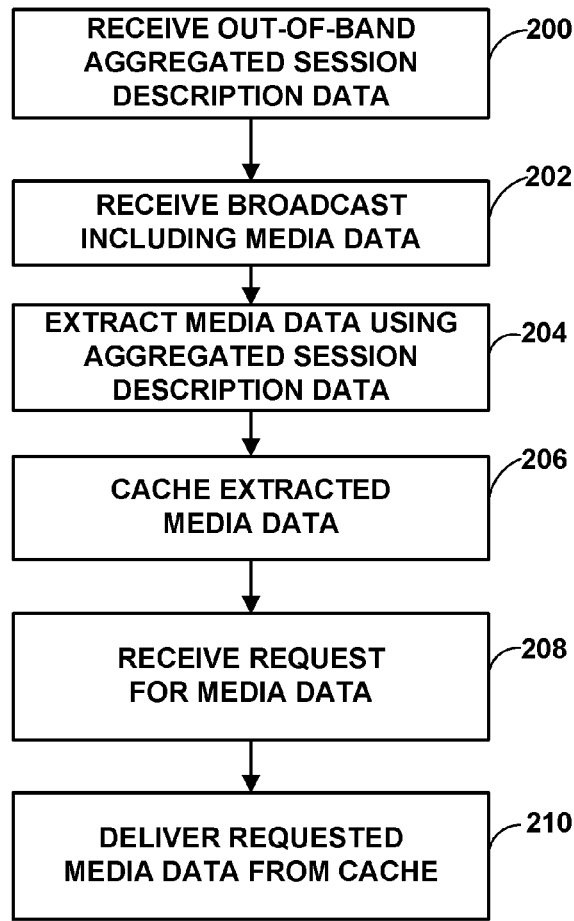
FIG. 15 is a flowchart illustrating an example method for using out-of-band aggregated session description data to retrieve media data from an over-the-air (OTA) broadcast in accordance with the techniques of this disclosure.

FIG. 15 is a flowchart illustrating an example method for using out-of-band aggregated session description data to retrieve media data from an over-the-air (OTA) broadcast. The method of FIG. 15 is explained as being performed by OTA broadcast middleware unit 100 of FIG. 3. However, it should be understood that other devices may be configured to perform a similar method.

In this example, OTA broadcast middleware unit 100 receives out-of-band aggregated session description data (200). The aggregated session description data is "out-of-band" relative to an OTA broadcast of media data, e.g., in the form of a plurality of sessions that each transport respective media data for, e.g., a respective plurality of representations. In other words, OTA broadcast middleware unit 100 receives the aggregated session description data separately from the media data of an OTA broadcast. The aggregated session description data may conform to an LSID fragment or other unit of data including similar information. For example, the aggregated session description data may conform to Table 1 above. Additionally, the aggregated session description data may include EFDT data similar to an FDT of FLUTE for the plurality of sessions, but which may contain additional file descriptors not included in the nominal FDT. OTA broadcast middleware unit 100 also receives the OTA broadcast including the media data (202).

OTA broadcast middleware unit 100 extracts at least a portion of the media data from the received OTA broadcast using the aggregated session description data (204). For example, OTA broadcast middleware unit 100 may use the process described above with respect to FIG. 7 to extract the media data. OTA broadcast middleware unit 100 may extract all of the media data or only portions of the media data that can be used by client device 40, e.g., based on coding and/or rendering characteristics supported by client device 40 and/or user input.

After extracting the media data, OTA broadcast middleware unit 100 may cache the extracted media data in cache 104 (206). OTA broadcast middleware unit 100 may subsequently receive a request for the media data (208), e.g., from DASH client 110. In response to the request, OTA broadcast middleware unit 100 may deliver the requested media data from cache 104 (210), e.g., to DASH client 110. Although not shown in FIG. 15, it should be understood that OTA broadcast middleware unit 100 may further deliver one or more manifest files, such as one or more MPDs, to DASH client 110 such that DASH client 110 can prepare and submit the request for the media data to OTA broadcast middleware unit 100. Furthermore, DASH client 110 may submit a plurality of requests (e.g., HTTP GET or partial GET requests) to OTA broadcast middleware unit 100 to retrieve data of a plurality of respective segments.

In this manner, the method of FIG. 15 represents an example of a method including, by an OTA broadcast middleware unit, receiving aggregated session description data for a plurality of sessions, wherein each of the sessions transports media data related to common media content, and wherein each of the sessions is transmitted as part of an OTA broadcast, and extracting at least some of the media data from the OTA broadcast based on the aggregated session description data.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk, and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of receiving media data, the method comprising, by an over-the-air (OTA) broadcast middleware unit:
  receiving an aggregated session description data fragment for a plurality of Real-Time Object Delivery over Unidirectional Transport (ROUTE) sessions, wherein each of the ROUTE sessions is to be transmitted as part of an OTA broadcast, the aggregated session description data fragment for the plurality of ROUTE sessions including:
    a broadcast stream identifier that identifies a broadcast stream in which the plurality of ROUTE sessions are to be carried;
    an identifier element that references at least a portion of a corresponding user service description (USD) fragment;
    a plurality of ROUTE transport session elements corresponding to the plurality of ROUTE sessions, each ROUTE transport session element comprising:
      a sender IP address element that specifies a sender IP address of the ROUTE session;
      a destination IP address element that specifies a destination IP address of the ROUTE session;
      a port element that specifies a port of the ROUTE session; and
  extracting at least some of the media data from the OTA broadcast based on the aggregated session description data fragment.

2. The method of claim 1, wherein receiving the aggregated session data fragment comprises receiving the aggregated session description data out of band relative to the media data of the OTA broadcast.

3. The method of claim 1, wherein the media data comprises a sequence of media segments formatted according to Dynamic Adaptive Streaming over HTTP (DASH).

4. The method of claim 1, wherein the aggregated session description data fragment comprises a layered coding transport (LCT) Session Instance Description (LSID) fragment.

5. The method of claim 1, wherein receiving the aggregated session description data fragment comprises receiving metadata out of band relative to the plurality of sessions carrying the media data described by the metadata.

6. The method of claim 1,
  retrieving information from a Lower Layer Signaling (LLS) stream;
  tuning to a service layer signaling (SLS) stream using information retrieved from the LLS stream;
  retrieving from the SLS stream:
    the corresponding user service description (USD) fragment,
    the aggregated session description data fragment for the plurality of ROUTE sessions,
    a Media Presentation Description (MPD) fragment, and
    a Schedule fragment;
  selecting service components using the corresponding user service description (USD) fragment, the aggregated session description data fragment for the plurality of ROUTE sessions, the MPD fragment, and the Schedule fragment; and tuning to the selected service component streams over respective Real-Time Object Delivery over Unidirectional Transport (ROUTE)/LCT sessions;
wherein extracting at least some of the media data from the OTA broadcast based on the aggregated session description data fragment comprises extracting media data from the selected service component streams.

7. A method of receiving media data, the method comprising, by an over-the-air (OTA) broadcast middleware unit:
receiving aggregated session description data for a plurality of sessions, wherein each of the sessions transports media data related to common media content, and wherein each of the sessions is transmitted as part of an OTA broadcast, wherein receiving the aggregated session description data includes:
receiving an identifier element that references a corresponding user service description (USD) element;
receiving one or more broadcast stream identifier elements that identify broadcast streams corresponding to the plurality of sessions;
receiving one or more sender IP address elements that specify IP addresses for senders of the broadcast streams;
receiving one or more destination IP address elements that specify IP addresses for destinations of the broadcast streams;
receiving one or more port elements that specify destination ports for the broadcast streams;
receiving one or more physical layer pipe (PLP) ID elements that specify identifiers for the PLP within the broadcast streams;
receiving one or more transport session identifier (TSI) elements that specify TSIs of associated source or repair flows for the broadcast streams;
receiving one or more bandwidth elements that specify maximum bit-rates for the plurality of sessions;
receiving one or more start time elements that specify start times for the plurality of sessions; and
receiving one or more end time elements that specify end times for the plurality of sessions; and
extracting at least some of the media data from the OTA broadcast based on the aggregated session description data.

8. A device for receiving media data, the device comprising:
an interface configured to receive over-the-air (OTA) broadcast data; and
a processor comprising an OTA broadcast middleware unit configured to:
receive, via the interface, an aggregated session description data fragment for a plurality of Real-Time Object Delivery over Unidirectional Transport (ROUTE) sessions, wherein each of the ROUTE sessions is to be transmitted as part of an OTA broadcast, the aggregated session description data fragment for the plurality of ROUTE sessions including:
a broadcast stream identifier that identifies a broadcast stream in which the plurality of ROUTE sessions are to be carried;
an identifier element that references at least a portion of a corresponding user service description (USD) fragment;
a plurality of ROUTE transport session elements corresponding to the plurality of ROUTE sessions, each ROUTE transport session element comprising:
a sender IP address element that specifies a sender IP address of the ROUTE session;
a destination IP address element that specifies a destination IP address of the ROUTE session;
a port element that specifies a port of the ROUTE session; and
extract at least some of the media data from the OTA broadcast based on the aggregated session description data fragment.

9. The device of claim 8, wherein the OTA middleware unit is configured to:
retrieve information from a Lower Layer Signaling (LLS) stream of the OTA broadcast;
tune to a service layer signaling (SLS) stream using information retrieved from the LLS stream;
retrieve from the SLS stream:
the corresponding user service description (USD) fragment,
the aggregated session description data fragment for the plurality of ROUTE sessions,
a Media Presentation Description (MPD) fragment, and
a Schedule fragment;
select service components using the corresponding user service description (USD) fragment, the aggregated session description data fragment for the plurality of ROUTE sessions, the MPD fragment, and the Schedule fragment; and
tune to the selected service component streams over respective Real-Time Object Delivery over Unidirectional Transport (ROUTE)/LCT sessions;
wherein, to extract at least some of the media data from the OTA broadcast based on the aggregated session description data fragment, the OTA middleware unit is configured to extract media data from the selected service component streams.

10. A non-transitory computer-readable storage medium having stored thereon instructions that, when executed, cause a processor of a device for receiving media data to:
receive an aggregated session description data fragment for a plurality of Real-Time Object Delivery over Unidirectional Transport (ROUTE) sessions, wherein each of the ROUTE sessions is to be transmitted as part of an over-the-air (OTA) broadcast, the aggregated session description data fragment for the plurality of ROUTE sessions including:
a broadcast stream identifier that identifies a broadcast stream in which the plurality of ROUTE sessions are to be carried;
an identifier element that references at least a portion of a corresponding user service description (USD) fragment;
a plurality of ROUTE transport session elements corresponding to the plurality of ROUTE sessions, each ROUTE transport session element comprising:
a sender IP address element that specifies a sender IP address of the ROUTE session;
a destination IP address element that specifies a destination IP address of the ROUTE session;
a port element that specifies a port of the ROUTE session; and
extract at least some of the media data from the OTA broadcast based on the aggregated session description data fragment.

11. The non-transitory computer-readable storage medium of claim 10, wherein the instructions, when executed, further cause the processor to:

retrieve information from a Lower Layer Signaling (LLS) stream;
tune to a service layer signaling (SLS) stream using information retrieved from the LLS stream;
retrieve from the SLS stream:
  the corresponding user service description (USD) fragment,
  the aggregated session description data fragment for the plurality of ROUTE sessions,
  a Media Presentation Description (MPD) fragment, and
  a Schedule fragment;
select service components using the USBD fragment, the LSID fragment, the MPD fragment, and the Schedule fragment; and
tune to the selected service component streams over respective Real-Time Object Delivery over Unidirectional Transport (ROUTE)/LCT sessions;
wherein the instructions that cause the processor to extract comprise instructions that cause the processor to extract media data from the selected service component streams.

* * * * *